(12) United States Patent
Murakami et al.

(10) Patent No.: US 8,408,381 B2
(45) Date of Patent: Apr. 2, 2013

(54) TROLLEY-TYPE CONVEYANCE DEVICE

(75) Inventors: Masami Murakami, Shanghai (CN); Jianguo Wang, Shanghai (CN)

(73) Assignees: Daifuku Co., Ltd. (JP); Daifuku (China) Co., Ltd. (CN)

( * ) Notice: Subject to any disclaimer, the term of this patent is extended or adjusted under 35 U.S.C. 154(b) by 0 days.

(21) Appl. No.: 13/619,650

(22) Filed: Sep. 14, 2012

(65) Prior Publication Data

US 2013/0015039 A1 Jan. 17, 2013

Related U.S. Application Data

(63) Continuation of application No. PCT/CN2011/001138, filed on Jul. 11, 2011.

(30) Foreign Application Priority Data

| Jul. 9, 2010 | (CN) | 2010 2 0253390 U |
| Jul. 9, 2010 | (CN) | 2010 2 00253398 U |
| Aug. 17, 2010 | (CN) | 2010 1 0255351 |
| Aug. 17, 2010 | (CN) | 2010 2 00294309 U |
| Aug. 17, 2010 | (CN) | 2010 2 0294310 U |

(51) Int. Cl.
*B65G 29/00* (2006.01)

(52) U.S. Cl. .......... 198/468.8; 198/468.6; 198/465.1

(58) Field of Classification Search ............ 198/465.1, 198/465.2, 580, 468.6, 468.8; 414/749.1, 414/589; 104/48, 50, 128, 130.07
See application file for complete search history.

(56) References Cited

U.S. PATENT DOCUMENTS

| 5,743,705 | A | * | 4/1998 | Eissfeller | 414/749.1 |
| 6,105,749 | A | * | 8/2000 | Block et al. | 198/370.03 |
| 6,427,305 | B1 | * | 8/2002 | Graham et al. | 198/346.3 |
| 7,077,620 | B2 | | 7/2006 | Ishioka | |
| 7,458,455 | B2 | * | 12/2008 | Nakamura et al. | 198/463.3 |
| 7,658,273 | B2 | * | 2/2010 | Nakamura et al. | 198/414 |
| 7,731,013 | B2 | * | 6/2010 | Milner et al. | 198/468.6 |
| 7,921,986 | B2 | * | 4/2011 | Ando et al. | 198/468.6 |
| 7,971,536 | B2 | * | 7/2011 | Sugimoto | 104/48 |
| 8,056,701 | B2 | * | 11/2011 | Sugimoto | 198/463.3 |

FOREIGN PATENT DOCUMENTS

| CN | 1718530 A | 1/2006 |
| CN | 101001797 A | 7/2007 |
| CN | 101549718 A | 10/2009 |
| CN | 102019975 A | 4/2011 |
| JP | 62171521 U | 10/1987 |
| JP | 4306162 A | 10/1992 |
| JP | 6059731 A | 3/1994 |

OTHER PUBLICATIONS

International Search Report; Application No. PCT/CN2011/001138; Issued: Oct. 9, 2011; Mailing Date: Oct. 27, 2011; 4 pages.

* cited by examiner

*Primary Examiner* — James R Bidwell
(74) *Attorney, Agent, or Firm* — St. Onge Steward Johnston & Reens LLC

(57) ABSTRACT

A carriage-type conveying apparatus with a workpiece support base and an elevating drive has a passive shaft interlocked with the elevating drive and a lock to prevent descent of the workpiece support base A power source carriage capable of traveling synchronously with the conveying carriage is aside of a traveling path of the conveying carriage at a workpiece support height changing position so as to be reciprocable along the traveling path. The power source carriage has a transmission shaft driven by a power source and a separable interlock to interlock the passive shaft and a transmission shaft with each other.

8 Claims, 14 Drawing Sheets

TROLLEY-TYPE CONVEYANCE DEVICE

CROSS-REFERENCE TO RELATED APPLICATIONS

The present application is a continuation of pending International patent application PCT/CN2011/001138 filed on Jul. 11, 2011 which designates the United States and claims priority from Chinese patent application Nos. 2010 2 0253390.0 filed on Jul. 9, 2010, 2010 2 0253398.7 filed on Jul. 9, 2010, 2010 1 0255351.9 filed on Aug. 17, 2010, 2010 2 0294310.6 filed on Aug. 17, 2010, and 2010 2 00294309.3 filed on Aug. 17, 2010, the contents of which are incorporated herein by reference.

FIELD OF THE INVENTION

The present invention relates to a carriage-type conveying apparatus which can be utilized for conveying vehicle bodies in an automobile assembly line.

BACKGROUND OF THE INVENTION

A support level of a vehicle body supported on a conveying carriage needs to be variable according to work content with respect to the vehicle body in the carriage-type conveying apparatus which can be used for conveying vehicle bodies in an automobile assembly line. Therefore, an elevatable workpiece support base and an elevating drive means therefor are provided on the conveying carriage. In a conventional carriage-type conveying apparatus of this kind, a motor which is a power source to drive the elevating drive means for the workpiece support base is installed on the conveying carriage itself, as described in Patent Document 1.

PRIOR ART DOCUMENTS

Patent Document 1: Japanese Unexamined Patent Application Publication No. H04-306162

SUMMARY OF THE INVENTION

The conveying carriage with the elevatable workpiece support base used in the automobile assembly line is made to travel in such a manner that the rear of a preceding conveying carriage and the front of a following conveying carriage butt against each other. Thus, a considerable number of conveying carriages are needed in the automobile assembly line. When the conventional configuration as described in Patent Document 1 is employed in such a conveying carriage, a motor for vertically driving the workpiece support base has to be installed on each of a considerable number of conveying carriages. This results in a high cost of the conveying carriage itself and, eventually, the entire equipment.

The present invention proposes a carriage-type conveying apparatus which can solve the afore-described conventional problem. The carriage-type conveying apparatus according to the present invention, described with reference symbols in parentheses used in the description of an embodiment described below in order to facilitate understanding the relationship with the embodiment, includes a conveying carriage (1) provided with an elevatable workpiece support base (2) and an elevating drive means (3) to vertically drive the workpiece support base (2), a workpiece support height changing position (C1, C2, E1, or E2) set on a traveling path of the conveying carriage (1) and when the conveying carriage (1) passes through the workpiece support height changing position (C1, C2, E1, or E2), the elevating drive means (3) is activated to change a height of the workpiece support base (2), a power source carriage (52) provided aside of the traveling path of the conveying carriage (1) at the workpiece support height changing position (C1, C2, E1, or E2) so as to be reciprocable along the traveling path, a synchronization drive means (60) provided aside of the traveling path of the conveying carriage (1) at the workpiece support height changing position (C1, C2, E1, or E2) to make the power source carriage (52) travel synchronously with the conveying carriage (1) by a fixed distance, a passive shaft (22) provided to the conveying carriage (1) and interlocked with a driving shaft (43) of the elevating drive means (3), a locking means (23) provided to the conveying carriage (1) to prevent descent of the workpiece support base (2) while the passive shaft (22) does not receive a torque, a transmission shaft (58) provided to the power source carriage (52) and transmitting a torque to the passive shaft (22), a power source (59) provided to the power source carriage (52) and rotationally driving the transmission shaft (58), and a separable interlocking means (61) to interlock the passive shaft (22) and the transmission shaft (58) with each other in a state where the conveying carriage (1) and the power source carriage (52) synchronously travel.

When the afore-described present invention is carried out, the locking means (23) can easily be realized by interposing a worm gear reducer (44) in a transmission system between the driving shaft (43) of the elevating drive means (3) and the passive shaft (22). Further, the synchronization drive means to make the conveying carriage (1) and the power source carriage (52) synchronously travel at each workpiece support height changing position can be achieved by a means to electrically synchronously control a driving motor for a travel drive means provided to the power source carriage (52). When the synchronization drive means (60) is configured by a couplable and separable coupling means (62) to couple the conveying carriage (1) and the power source carriage (52), however, the conveying carriage and the power source carriage are mechanically coupled and integrated, and the both can steadily be made to travel synchronously.

The coupling means (62) in this case may be of any configuration as long as it can couple the conveying carriage (1) and the power source carriage (52) in such a state that the power source carriage can follow and travel with an advance traveling of the conveying carriage. Proposed in the present invention is a coupling means (62) composed of a held portion (63) provided to the conveying carriage (1), openable and closable holders (64a and 64b) provided to the power source carriage (52) so as to be capable of holding the held portion (63) therebetween from the front and rear in the traveling direction of the conveying carriage (1), and a switch drive means (65) provided to the power source carriage (52) to switch the holders (64a and 64b) between a retract state of retracting outside the moving path of the held portion (63) and a holding state of holding the held portion (63). When such coupling means (62) of the present invention is employed, the conveying carriage and the power source carriage can reliably be coupled mechanically despite the simple configuration, whereupon the power source carriage can steadily be made to travel synchronously with the traveling of the conveying carriage.

Further, the transmission shaft (58) and the passive shaft (22) are arranged concentrically with each other and orthogonal to the traveling direction in the synchronous traveling state of the conveying carriage (1) and the power source carriage (52). The transmission shaft (58) and the passive shaft (22) are also provided with respective rotation transmitting fitting distal ends (22a and 58a) so as to be fittable to and separable from each other. The interlocking means (61) can be constituted by a transmission shaft in-and-out drive means (72) to drive the transmission shaft (58) to move in and out in its axial center direction. The transmission shaft in-and-out drive means (72) in this case is constituted by a movable body (73) supported on the power source carriage (52) so as to be reciprocable in the axial center direction of the transmission shaft (58), a movable body drive means (74) to reciprocate the movable body (73), a relay shaft (89) supported to the movable body (73) so as to only be self-rotatable, and a motor (59) supported to the movable body (73) as the power source and rotationally driving the relay shaft (89). The transmission shaft (58) is fitted to the relay shaft (89) relatively movably only in the axial center direction within a fixed range. A spring (96) is interposed between the transmission shaft (58) and the relay shaft (89), whereby the transmission shaft (58) is biased toward an advancing direction with respect to the relay shaft (89). It can be configured such that the transmission shaft (58) retracts with respect to the relay shaft (89) against the spring (96) after the transmission shaft (58) and the passive shaft (22) are fitted to each other at respective rotation transmitting fitting distal ends (22a and 58a), when the movable body (73) moves to an advance limit in the synchronous traveling state of the conveying carriage (1) and the power source carriage (52).

Furthermore, a positioning rod (98a or 98b) arranged parallel to the transmission shaft (58) and having a conical pointed end (104a or 104b) is supported to the movable body (73) so as to be reciprocable in an axial center direction within a fixed range. The movable body (73) is also juxtaposed with a spring (102a or 102b) biasing the positioning rod (98a or 98b) toward the traveling path side of the conveying carriage (1). The conveying carriage (1) is provided with a positioning fitted member (106a or 106b) having a conical hole (105a or 105b) to which the conical pointed end (104a or 104b) of the positioning rod (98a or 98b) can be fitted. It can be configured such that the conical pointed end (104a or 104b) of the positioning rod (98a or 98b) is fitted to the conical hole (105a or 105b) of the positioning fitted member (106a or 106b) before the transmission shaft (58) and the passive shaft (22) are fitted to each other at the rotation transmitting fitting distal ends (22a and 58a) when the movable body (73) is made to advance in the synchronous traveling state of the conveying carriage (1) and the power source carriage (52) and such that the positioning rod (98a or 98b) retracts against the spring (102a or 102b) when the movable body (73) moves to the advance limit.

Further, a movable base plate (83) being movable with respect to an origin position in a two-dimensional vertical plane within a fixed range and being biased and held at the origin position by springs (111a to 112b and 117a to 118b) can be provided to the movable body (73) thereby to support the relay shaft (89) and the motor (59).

According to the configuration of the present invention, the need to install a power source such as an electric motor for vertically driving the elevatable workpiece support base provided to the conveying carriage, on the conveying carriage is eliminated. The power source has only to be installed on the power source carriage juxtaposed at each workpiece support height changing position and being remarkably small in number compared with the conveying carriages for the entire equipment. Even if the power source carriage has to be juxtaposed at each workpiece support height changing position, the number of power sources such as electric motors used can be reduced significantly for the entire equipment, whereupon equipment cost reduction can be achieved. Furthermore, on the traveling path other than each workpiece support height changing position, not only is an accidental descent of the workpiece support base avoided by the locking means but also a fear of causing unexpected occurrences such as the workpiece support base being vertically driven due to a control system failure or a worker's misoperation is eliminated, whereupon safety is further improved.

DETAILED DESCRIPTION OF THE INVENTION

Figure 1:
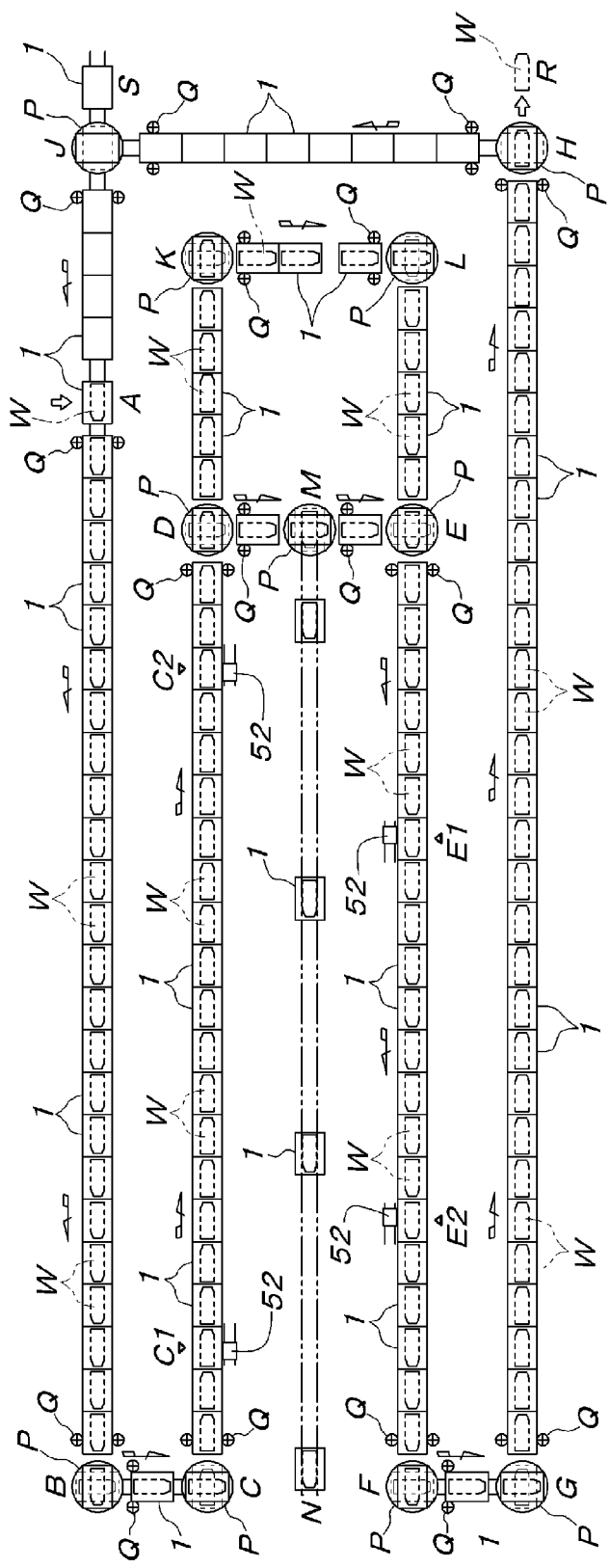
FIG. 1 is a schematic plan view showing a layout of an automobile assembly line composed of a carriage-type conveying apparatus of the present invention.

An automobile assembly line as shown in FIG. 1 consists of an endless circulating traveling path for conveying carriages 1. The line includes a first working section A-B, a first relay section B-C, a second working section C-D, a second relay section D-E, a third working section E-F, a third relay section F-G, a fourth working section G-H, and an empty conveying carriage returning section H-J-A. A buffer section D-K-L-E is connected with the second relay section D-E in parallel. An auxiliary section M-N which is temporarily used diverges from the second relay section D-E. Conveying carriage deflectors P as referred to as turntables are respectively arranged at both ends B to G of each relay section B-C, D-E, or F-G, at the beginning end H and an intermediate turning point J of the empty conveying carriage returning section H-J-A, at intermediate turning points K and L of the buffer section D-K-L-E, and at the beginning end M of the auxiliary section M-N.

The conveying carriage deflector P is known in the art. The deflector P horizontally rotates a conveying carriage 1 having been transferred from the traveling path on an upstream side and sends the carriage 1 out to the traveling path on a downstream side. The deflector P includes a turntable which rotates in forward and reverse directions within a predetermined angle (generally, 90 degrees), a conveying carriage supporting and guiding guide rail provided on the turntable and connected to the upstream side traveling path or the downstream side traveling path in an alternative way, a lead-in drive means provided on the turntable and leading in the conveying carriage 1 having been transferred from the upstream traveling path to a predetermined position on the turntable, and a sending-out drive means provided on the turntable and sending out the conveying carriage 1 at the predetermined position on the turntable to the downstream traveling path. Further, a friction drive Q for making the conveying carriage 1 travel at a constant speed is installed at each of the working sections A-B, C-D, E-F, and G-H, the empty conveying carriage returning section H-J-A, each of the relay sections B-C, D-E, and F-G, and the buffer section D-K-L-E. The friction drive Q basically takes over the conveying carriage 1 having been sent from the upstream side and sends it out to the downstream side. In a section where the necessary number of conveying carriages 1 is made to travel together at a constant speed while the front and the rear thereof butt against each other, as shown in each of the working sections A-B, C-D, E-F, and G-H, the friction drive Q is arranged at each of the beginning end and the terminal end of the section.

In the thus configured automobile assembly line as shown, a workpiece (an automobile vehicle body) W is loaded on the conveying carriage 1 at the beginning end A of the first working section A-B. The conveying carriage 1 having been loaded with workpiece W is sent into the first working section A-B, the second working section C-D, the third working section E-F, and the fourth working section G-H sequentially. While the conveying carriage 1 travels forward within each working section at a constant speed, a predetermined task having been defined for each working section is performed on the workpiece W by a worker who gets on each conveying carriage 1. Tasks with respect to a lower region of the workpiece W are performed at the first and fourth working sections A-B and G-H. At the second and third working sections C-D and E-F, the height of the workpiece support base provided to each conveying carriage 1 is raised to a predetermined high level when the conveying carriage 1 passes through workpiece support height changing positions C1 and E1 at the entrances sides. The height of the workpiece support base is lowered to a predetermined low level when the conveying carriage 1 passes through workpiece support height changing positions C2 and E2 at the exits sides. Thus, tasks with respect to a higher region corresponding to the workpiece W support height at the moment are performed between the workpiece support height changing positions C1 and C2 at the second working section C-D and the workpiece support height changing positions E1 and E2 at the third working section E-F.

The buffer section D-K-L-E can be utilized for temporary retraction of workpiece loaded conveying carriages 1 to be transferred to the third working section E-F from the second working section C-D and then for order change and rearrangement of workpiece loaded conveying carriages 1 to be sent into the third working section E-F. The auxiliary section M-N can be used for retracting and long-term waiting of the workpiece loaded conveying carriages 1 to be transferred to the third working section E-F from the second working section C-D. The workpiece loaded conveying carriage 1 having been sent into this auxiliary section M-N can be returned to an intermediate position of the second relay section D-E in a predetermined orientation by traveling the carriage 1 back at the auxiliary section M-N and using the conveying carriage deflector P arranged at the beginning end M of the auxiliary section M-N which intersects with an intermediate position of the second relay section D-E.

The workpiece W on the conveying carriage 1 having been sent from the fourth working section G-H, that is, the workpiece W where all of the tasks have been completed can be carried to a carrying-out position R by an appropriate carrying-out means from on the conveying carriage 1 on the conveying carriage deflector P arranged at an intersection between the terminal end of the fourth working section G-H and the beginning end of the empty conveying carriage returning section H-J-A. The empty conveying carriage 1 is sent back to the beginning end A of the first working section A-B via the empty conveying carriage returning section H-J-A. It is noted that the conveying carriage deflector P arranged at the intermediate turning point J of the empty conveying carriage returning section H-J-A is juxtaposed with a conveying carriage maintenance work area S at a position directly opposed to the empty conveying carriage returning section J-A side on the downstream side of the conveying carriage deflector P. Thus, a conveying carriage 1 that requires a maintenance check or simple repair work, among those to be sent into the beginning end A of the first working section A-B, can be sent out once to the conveying carriage maintenance work area S from the conveying carriage deflector P at the intermediate turning point J and be sent into the empty conveying carriage returning section J-A via the conveying carriage deflector P at the intermediate turning point J again after the necessary work is finished.

In the automobile assembly line composed of the carriage-type conveying apparatus of the present invention as described above, no dug-down pits on the floor side are necessary in the whole area of the traveling path of the conveying carriage 1. The conveying carriage 1 secures a working floor thereon at the entire periphery of the workpiece W having been supported by the elevatable workpiece support base. A worker can stand on the working floor at the periphery of the workpiece W on each conveying carriage 1 and perform tasks with respect to the workpiece W. The workpiece W support level is changed by elevating the workpiece support base, whereby assembling work, etc., at all regions of the workpiece W such as the interior, the exterior at the entire periphery, and the bottom can be performed. As a matter of course, the workpiece W does not need to be transferred onto an overhead conveyor in order to work the bottom of the workpiece W.

Hereinafter, the above conveying carriage 1 is described in detail, based on FIGS. 2 to 5. The conveying carriage 1 has a carriage main body 1a rectangular in plan, and the workpiece support base 2 is elevatably supported on the upper side of a middle portion of the carriage main body 1a by the elevating drive means 3. The conveying carriage 1 is provided with front and rear two pairs of left and right wheel units 5a to 5d on the bottom of the carriage main body 1a so as be able to travel on a pair of left and right guide rails 4a and 4b laid on the floor of the traveling path side. Each of the wheel units 5a to 5d includes a supporting wheel 6 rolling on the guide rail 4a or 4b and a cleaning tool 7 composed of a brush, etc., to clean an upper surface of the guide rail 4a or 4b. The pair of front and rear wheel units 5b and 5d corresponding to one of the guide rails 4b are provided with anti-sway rollers 8 pivotally and rotatably supported about vertical axes in such a manner as to sandwich the guide rail 4b from both lateral sides as shown in FIG. 5A and FIG. 5B.

Figure 6:
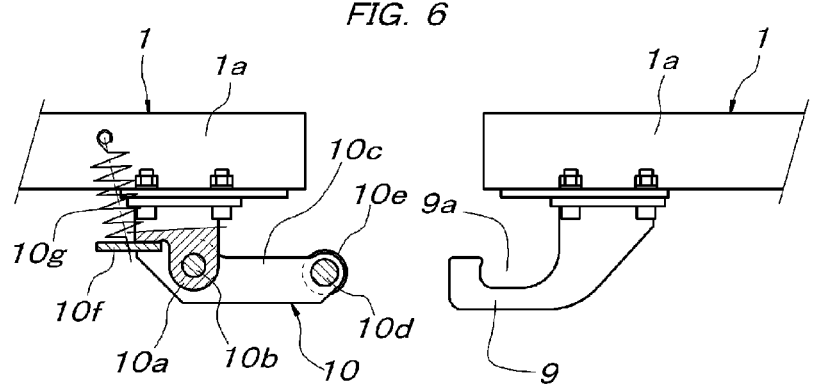
FIG. 6 is a partial longitudinal sectional side view showing a coupling means between conveying carriages in a non-coupling state.

Further, a towed hook 9 is attached on the underside of the front end of the carriage main body 1a, and a towing lock 10 engaged with the towed hook 9 of an immediately following conveying carriage 1 is provided on the underside of the rear end of the carriage main body 1a. Their detailed configurations are described based on FIGS. 6 to 8. The towed hook 9 has an engaged depression 9a on the topside of a distal end thereof. The towing lock 10 is constituted by a bearing 10a attached on the downside of the carriage main body 1a, a horizontal left-right lateral spindle 10b, and a pair of left and right plate members 10c vertically swingably, and pivotally supported at the bearing 10a by the spindle 10b. The towing lock 10 has a distal end provided with a lock shaft 10d crossing the paired left and right plate members 10c and extending on one side and a cam follower roller 10e at a distal end of the extended distal end of the lock shaft 10d. The towing lock 10 also has a rear end fixed with a contact plate 10f to integrally couple the paired left and right plate members 10c.

The towing lock 10 is biased in such a direction that the lock shaft 10d is lowered by gravity. Thus, the contact plate 10f abuts against a receiving portion formed on the bearing 10a, whereby the towing lock 10 is held in a locking posture for extending horizontally rearward from the spindle 10b. However, the towing lock 10 can also be biased and held in the locking posture forcibly by a spring 10g such as an extension coil spring interposed between the contact plate 10f and the carriage main body 1a, as well. The towing lock 10 swings vertically about the spindle 10b with the carriage main body 1a butting against that of an immediately following conveying carriage 1, whereupon the lock shaft 10b of the towing lock 10 can be vertically fitted to and separated from the engaged depression 9a of the towed hook 9 of the immediately following conveying carriage 1. Accordingly, in the state where the front and rear conveying carriages 1 butt against each other, the rear side conveying carriage 1 can be towed by the front side conveying carriage 1 according to necessity by switching the towing lock 10 of the front side conveying carriage 1 to the locking posture and fitting the lock shaft 10d of the towing lock 10 to the engaged depression 9a of the towed hook 9 of the rear side conveying carriage 1. At a place where the coupled state of the front and rear conveying carriages 1 by the engagement between the towed hook 9 and towing lock 10 needs to be canceled, a cam rail 11 pushing up the cam follower roller 10e with use of forward traveling of the conveying carriages 1 and then switching the towing lock 10 to a tow release posture has only to be laid on the floor side of the traveling path of the conveying carriage 1 as shown by the virtual line in FIG. 7.

Figure 2:
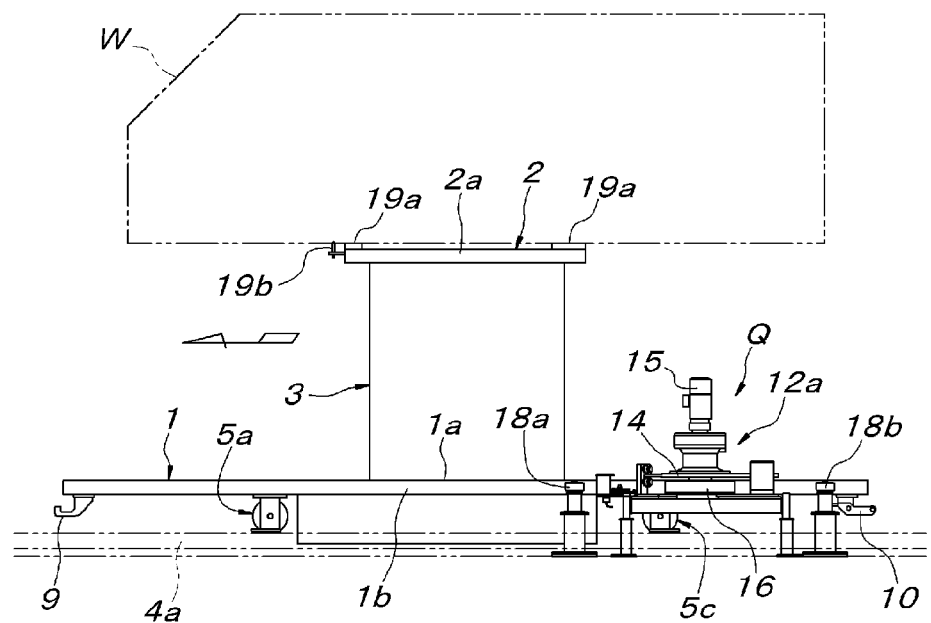
FIG. 2 is a side view of a conveying carriage and a friction drive means therefor on a traveling path.
Figure 3:
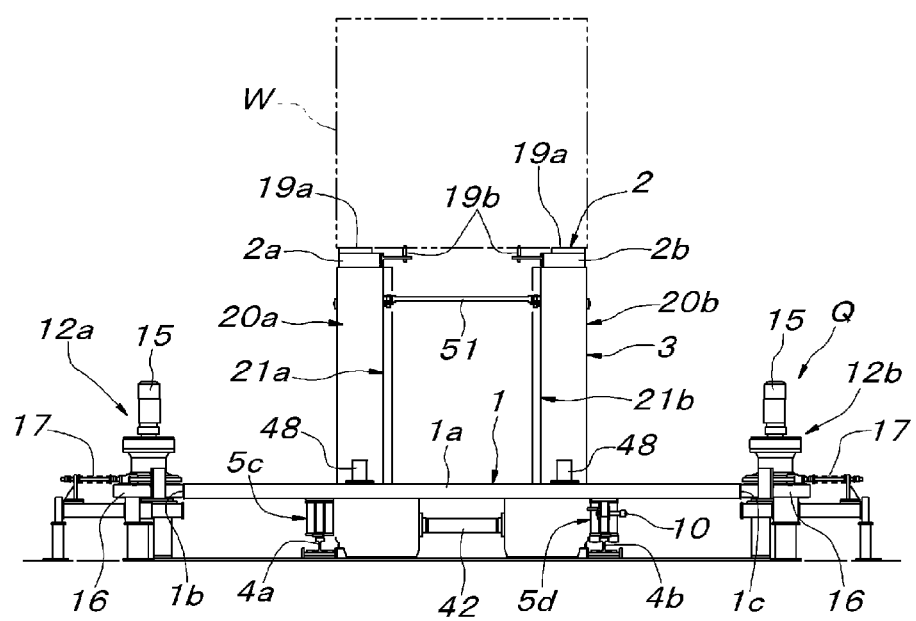
FIG. 3 is a rear view of the above.
Figure 4:
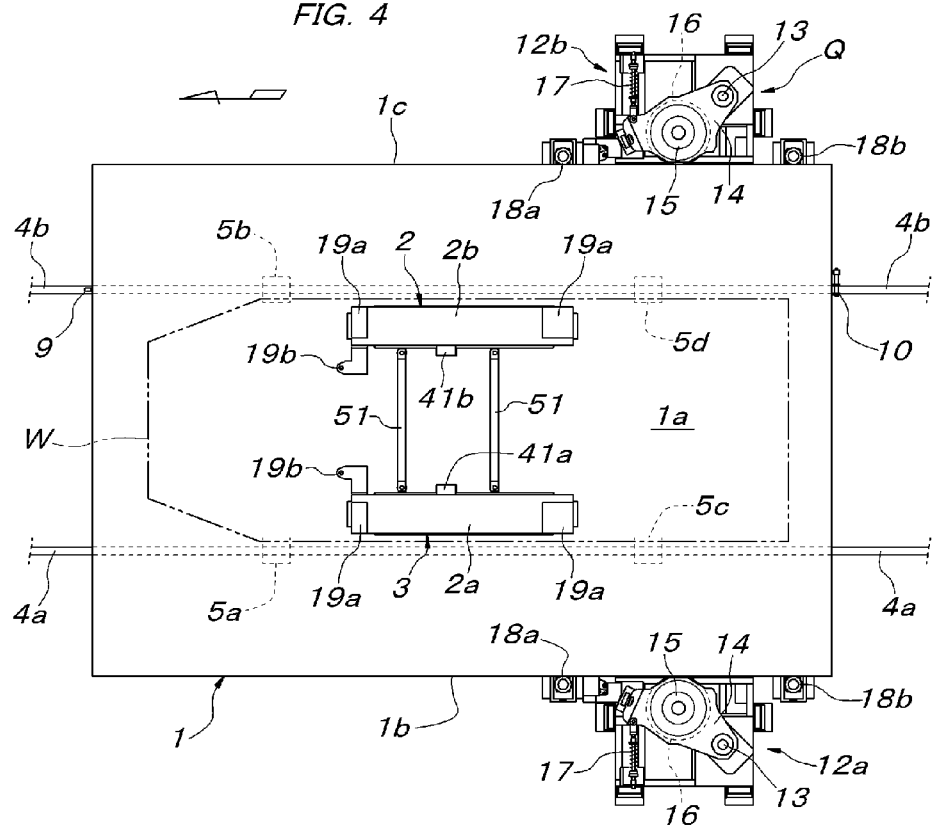
FIG. 4 is a plan view of the above.
Figure 5A:
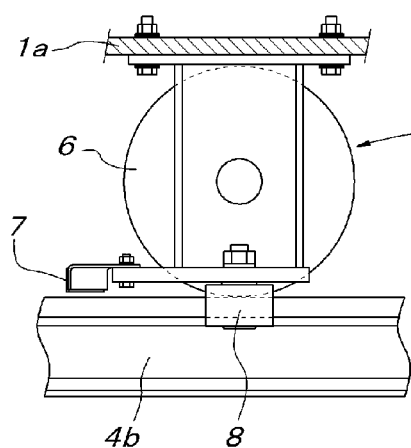
FIG. 5A is a side view showing a wheel unit on one side of the conveying carriage.
Figure 5B:
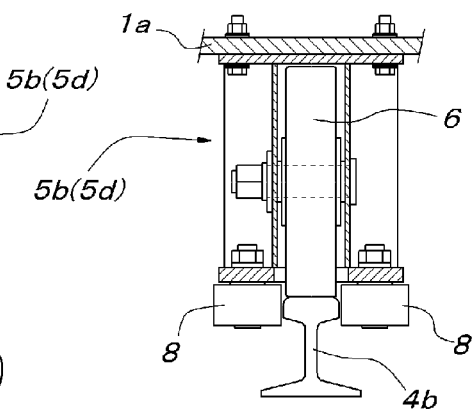
FIG. 5B is a longitudinal sectional front view of the wheel unit.

An example of the friction drive Q is described based on FIGS. 2 to 4. This friction drive Q is composed of a pair of left and right symmetrical drive units 12a and 12b arranged in such a manner as to sandwich the carriage main body 1a of the conveying carriage 1. Each of the drive units 12a and 12b is constituted by a movable base 14 pivotally supported so as to be horizontally swingable about a vertical spindle 13 within a fixed range, a reducer equipped motor 15 vertically mounted on the movable base 14, a friction drive wheel 16 attached to a vertical output shaft of the reducer equipped motor 15 on the underside of the movable base 14, and a spring 17 biasing the movable base 14 in a direction of moving the friction drive wheel 16 toward the traveling path side of the conveying carriage 1. While respective friction drive wheels 16 of both the drive units 12a and 12b are rotationally driven in directions opposed to each other at the same circumferential speed by respective reducer equipped motors 15, the conveying carriage 1 can be made to travel forward at a constant speed by pressure-contacting, by biasing forces of the springs 17, with friction drive surfaces 1b and 1c formed of both left and right parallel vertical linear lateral surfaces of the carriage main body 1a of the conveying carriage 1. In order to keep the posture of the conveying carriage 1 at the time of passing through the position of the friction drive Q in a posture perfectly parallel to the traveling path direction (the direction along the length of the guide rails 4a and 4b), a pair of front and rear rotatable guide rollers 18a and 18b which abut against the friction drive surface 1b or 1c of the conveying carriage 1 on both front and rear sides of the friction drive wheel 16 can be provided to each drive unit 12a or 12b.

The workpiece support base 2 on each conveying carriage 1 and the elevating drive means 3 therefor are described in detail based on FIGS. 9 to 13. The elevatable workpiece support base 2 is composed of a pair of left and right support base units 2a and 2b respectively supporting both lateral sides of the bottom of the workpiece (the automobile vehicle body) W. Each of the support base units 2a and 2b is provided with a pair of front and rear workpiece supporting surfaces 19a and a positioning pin 19b upwardly fitted into a vertical hole provided to the bottom of the workpiece W and positioning the workpiece W. In order to support the workpiece support base 2 elevatably, there are provided a pair of left and right multistage scissor linkages 20a and 20b respectively elevatably supporting the paired left and right support base units 2a and 2b of the workpiece support base 2. The elevating drive means 3 is composed of a pair of left and right zipper chain mechanisms 21a and 21b driving respective multistage scissor linkages 20a and 20b to vertically expand and contract, a driving shaft 43 for both the zipper chain mechanisms 21a and 21b, a passive shaft 22 interlocked with the driving shaft 43, and a locking means 23 interposed in a transmission system between the passive shaft 22 and the driving shaft 43.

Each of the multistage scissor linkages 20a and 20b is configured such that upper and lower scissor links 26a and 26b in each of which two laterally overlaid link units 24a and 24b are pivotally supported and coupled to each other at a middle portion thereof by a coupling shaft 25 are integrally coupled by coupling shafts 27a and 27b so as to be able to vertically expand and contract along a vertical plane being parallel to the traveling direction of the conveying carriage 1 and extending in the front-rear direction. Of lower ends of the link units 24a and 24b of the lower scissor link 26a, a front side one of the link unit 24b is pivotally supported and coupled to a stand 29 by a positionally fixed coupling shaft 28, and a rear side one of the link unit 24a is pivotally supported and coupled, by a coupling shaft 32, on a sliding block 31 supported on the stand 29 via a slide guide rail 30 so as to be movable in the front-rear direction. Of upper ends of the link units 24a and 24b of the upper scissor link 26a, a front side one of the link unit 24a is pivotally supported and coupled to the underside of the front end of the support base unit 2a or 2b by a positionally fixed coupling shaft 33, and a rear side one of the link unit 24b is pivotally supported and coupled, by a coupling shaft 36, on a sliding block 35 supported so as to be movable in the front-rear direction via a slide guide rail 34 laid on the underside of the rear end of the support base unit 2a or 2b.

It is noted that the coupling shafts 25, 27a, 27b, 28, 32, 33, and 36 of the paired left and right multistage scissor linkages 20a and 20b are all positioned concentrically with one another. Further, the stand 29 is installed on the underside of the carriage main body la of the conveying carriage 1. Therefore, the paired left and right multistage scissor linkages 20a and 20b provided on the stands 29 vertically penetrate openings provided to the carriage main body 1a.

Each of the zipper chain mechanisms 21a and 21b is constituted by a gear case 37 placed on the stand 29, a pair of front and rear chain wheels 38a and 38b pivotally supported within the gear case 37, chain storage cases 39a and 39b provided on the stand 29 so as to extend in both front and rear directions from the gear case 37, and a pair of front and rear chain main bodies 40a and 40b. These paired front and rear chain main bodies 40a and 40b are known in the art; the chain main bodies enter the inside of the gear case 37 from the inside of the chain storage cases 39a and 39b, extend directly above from between the paired front and rear chain wheels 38a and 38b while back sides thereof are meshed with the paired front and rear chain wheels 38a and 38b, and have upper ends coupled to the support base unit 2a or 2b via a bracket 41a or 41b, the chain main bodies 40a and 40b are configured so as to be able to be bent only in a direction of rotating around the peripheries of the chain wheels 38a and 38b (the back side), in the vertically extending part from between the paired front and rear chain wheels 38a and 38b to the support base unit 2a or 2b, mutually facing front sides of both chain main bodies 40a and 40b are meshed with each other to keep a vertical extending posture. The paired front and rear chain wheels 38a and 38b are interlocked so as to counterrotate with each other synchronously via a gear pivotally supported within the gear case 37 although the illustration thereof is omitted.

Both zipper chain mechanisms 21a and 21b are interlocked with each other by a transmission shaft 42 that couples the chain wheels 38b positioned concentrically with each other. The zipper chain mechanisms 21a and 21b also include a driving shaft 43 interlocked with the chain wheel 38b of one of the zipper chain mechanisms 21b. The driving shaft 43 is interlocked with the passive shaft 22 via a self-locking transmission means constituting the locking means 23, that is, a worm gear reducer 44, and a right-angled transmission means 45 interlocking the passive shaft 22 and an input shaft 44 to which a worm gear of the worm gear reducer 44 is attached. The passive shaft 22 is supported on the underside of one lateral side of the carriage main body la of the conveying carriage 1 and in the horizontal left-right direction parallel to the transmission shaft 42 and the driving shaft 43 via bearings 47 fixed to the carriage main body la via support plates 46.

According to the elevating drive means 3 thus configured, rotational driving of the passive shaft 22 transmits its torque to the chain wheels 38a and 38b of the paired left and right zipper chain mechanisms 21a and 21b via the right-angled transmission means 45, the worm gear reducer 44, the driving shaft 43, and the transmission shaft 42, whereby the chain main bodies 40a and 40b of respective zipper chain mechanisms 21a and 21b can be pushed-up driven or pulled-down driven. When the chain main bodies 40a and 40b of the respective chain mechanism 21a and 21b are pushed-up driven, the pair of left and right support base units 2a and 2b of the workpiece support base 2 are pushed up in synchronization with each other, whereas when the chain main bodies 40a and 40b of the respective chain mechanism 21a and 21b are pulled-down driven, the paired left and right support base units 2a and 2b of the workpiece support base 2 are lowered in synchronization with each other. At this time, both support base units 2a and 2b are respectively supported by the multistage scissor linkages 20a and 20b. Accordingly, the support base units 2a and 2b ascend and descend vertically parallel to each other within a range from the ascent limit height as shown in FIG. 9 to the descent limit height as shown in FIG. 10 while keeping horizontal postures at the same height with each other.

Figure 9:
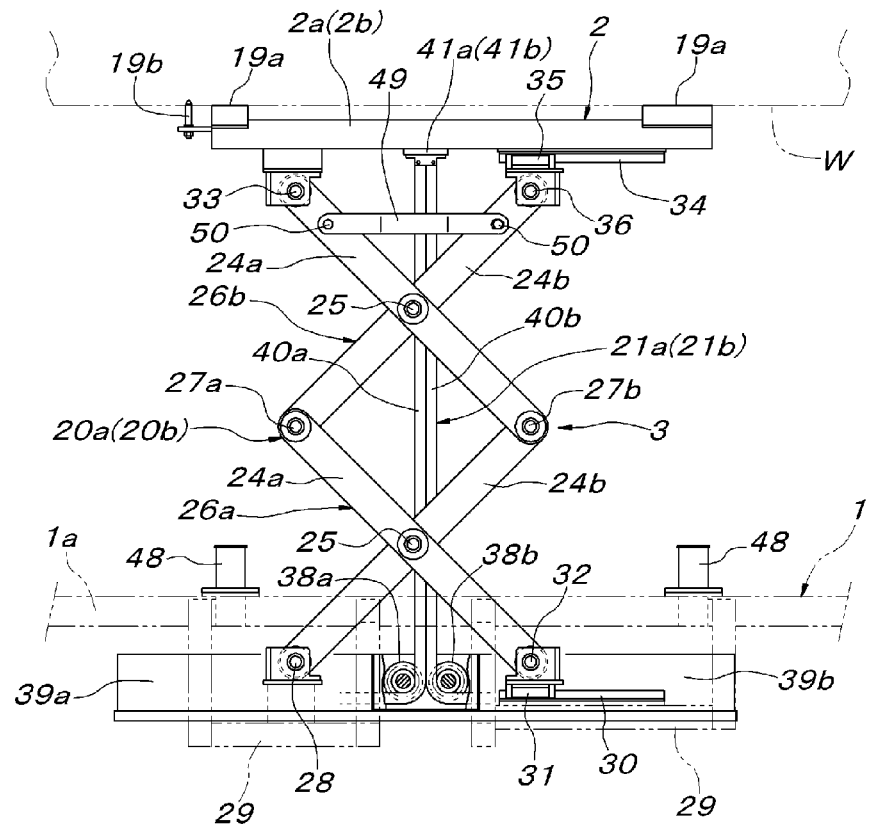
FIG. 9 is a side view showing an elevating drive means for a workpiece support base in a state where the workpiece support base is raised to an ascent limit level.
Figure 10:
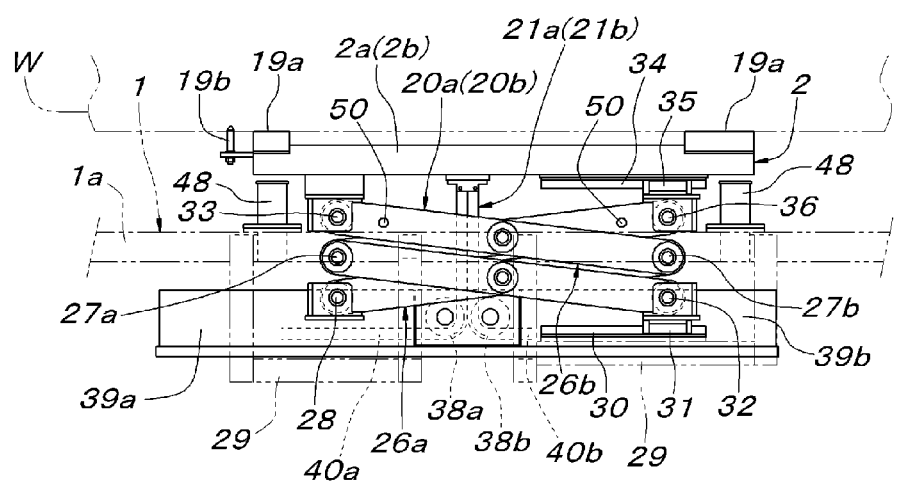
FIG. 10 is a side view showing the elevating drive means in a state where the workpiece support base is lowered to a descent limit level.

As long as support members 48 erected on the carriage main body la are configured to be positioned immediately below front and rear ends of respective support base units 2a and 2b when the support base units 2a and 2b descend to the descent limit height as shown in FIG. 10, both the support base units 2a and 2b having descended to the descent limit height can be received by the support members 48 stably. On the other hand, when both the support base units 2a and 2b are raised to the ascent limit height as shown in FIG. 9 (or a preset height), both support base units 2a and 2b are prevented from descending by gravity due to the existence of the worm gear reducer 44 constituting the locking means 23 even if the torque transmission to the passive shaft 22 is released and the passive shaft 22 is brought into a free state. In other words, it is impossible to move the chain main bodies 40a and 40b in the descending direction and rotate the chain wheels 38a and 38b, because the driving shaft 43 that moves in synchronization with these chain wheels 38a and 38b are non-rotatably locked by the worm gear reducer 44. Thus, the descent of both support base units 2a and 2b by gravity is steadily prevented due to the chain main bodies 40a and 40b between the support base units 2a and 2b and the chain wheels 38a and 38b serving like struts.

Figure 12:
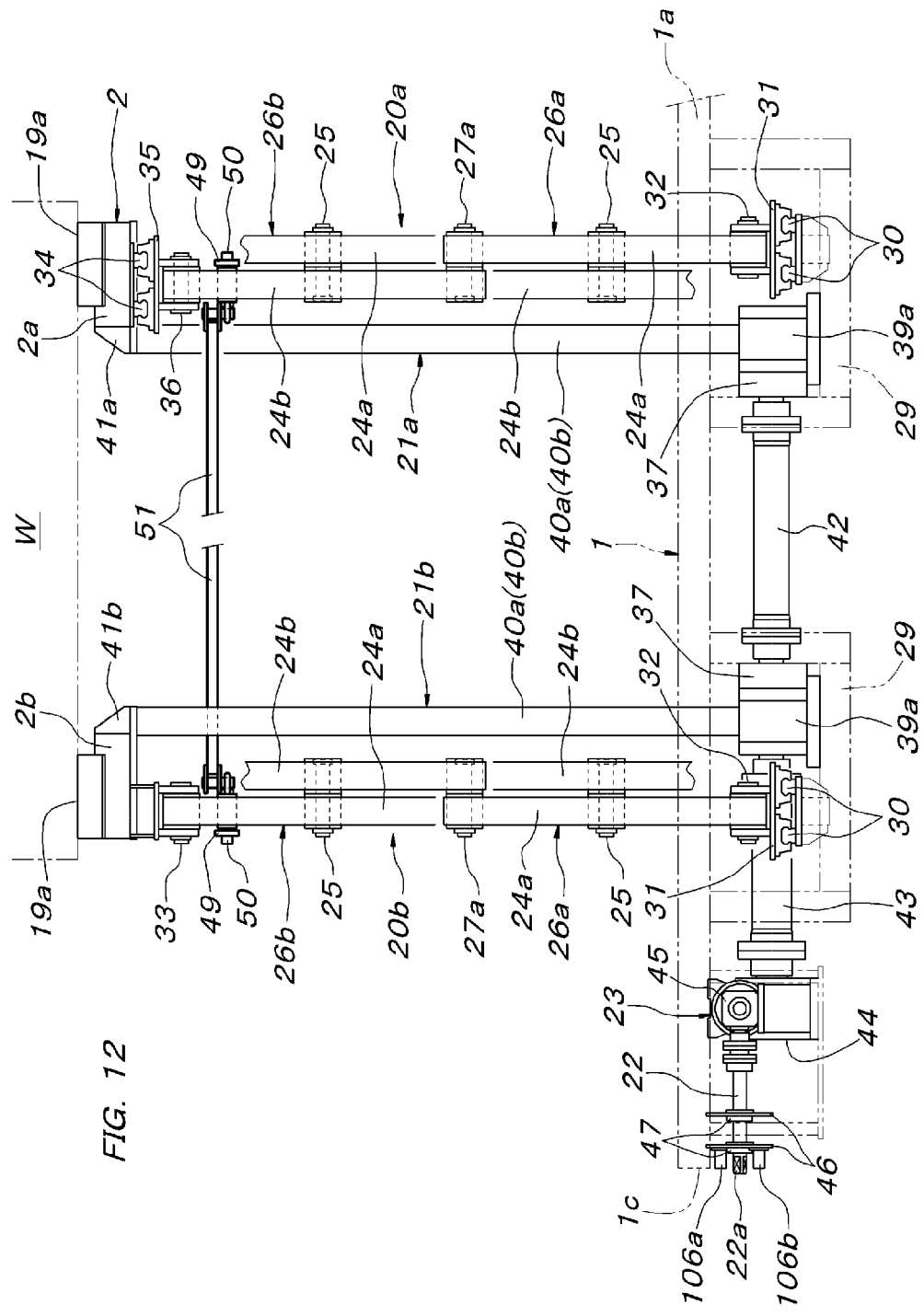
FIG. 12 is a front view showing the elevating drive means and the power transmission system for the elevating drive means.
Figure 13:
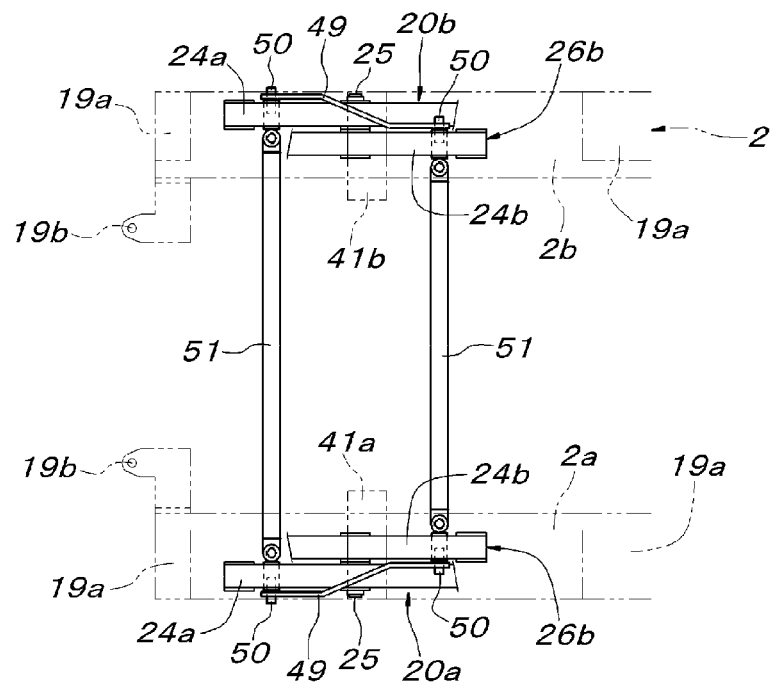
FIG. 13 is a plan view showing safety measures against the elevating drive means in the state where the workpiece support base is raised to the ascent limit level.

Further, a sense of safety can visually be given to workers by configuring such that a locking bar 49 for preventing each multistage scissor linkage 20a or 20b from vertically expanding and contracting can be set up as shown in FIGS. 9, 12, and 13 when both support base units 2a and 2b are raised to the ascent limit height as shown in FIG. 9 (or a preset height). The locking bar 49 couples, for example, the link units 24a and 24b of the upper scissor link 26b together. The locking bar 49 is set up by fitting holes at both ends thereof with respect to locking bar locking pins 50 projecting outward from the link units 24a and 24b, and the locking bar 49 is detached from the locking bar locking pins 50, thereby allowing for the vertical expanding and contracting of each scissor linkage 20a or 20b.

Further, the locking bar locking pins 50 fitted to the holes at both ends of the locking bar 49 are configured to be self-rotatably supported with respect to the link units 24a and 24b, as shown, besides, inner ends of the locking pins 50 projecting inside the link units 24a and 24b are formed into the shape of an eyebolt, and locking pins projected downward from both ends of a coupling rod 51 for coupling both multistage scissor linkages 20a and 20b together are configured to be downwardly fittable and lockable to the inner end eyebolt portions of the locking bar locking pins 50. This configuration can prevent both multistage scissor linkages 20*a* and 20*b* from swaying in a direction of opening outward. The coupling rod 51 (locking bar locking pins 50) can usually be kept installed between both multistage scissor linkages 20*a* and 20*b* by being configured to be positioned at a height not interfering with the carriage main body 1*a*, etc., when both multistage scissor linkages 20*a* and 20*b* contract and the workpiece support base 2 descends to the descent limit height as shown in FIG. 10. As a matter of course, eyebolts which lock the both ends of the coupling rod 51 can be attached to the link units 24*a* and 24*b* aside from the locking bar locking pins 50, as well.

Figure 14:
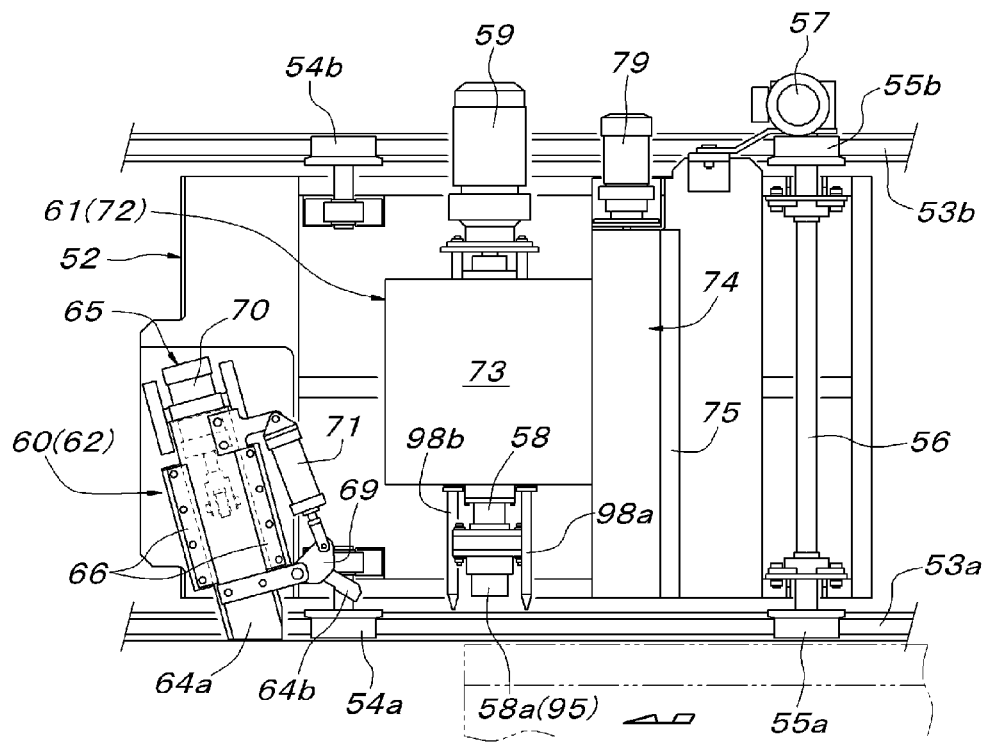
FIG. 14 is a plan view of a power source carriage.
Figure 15:
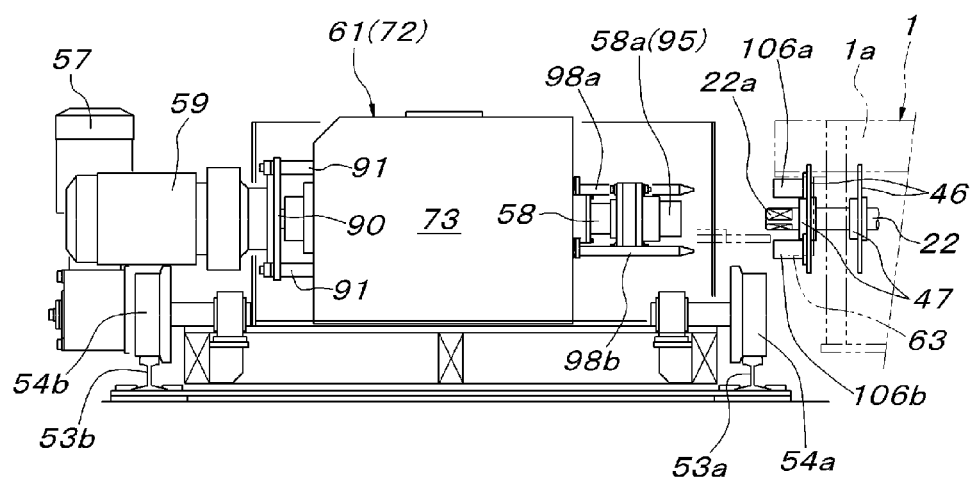
FIG. 15 is a front view showing a configuration of a transmission part of the power source carriage side and a configuration of a passive part of the conveying carriage side.
Figure 16:
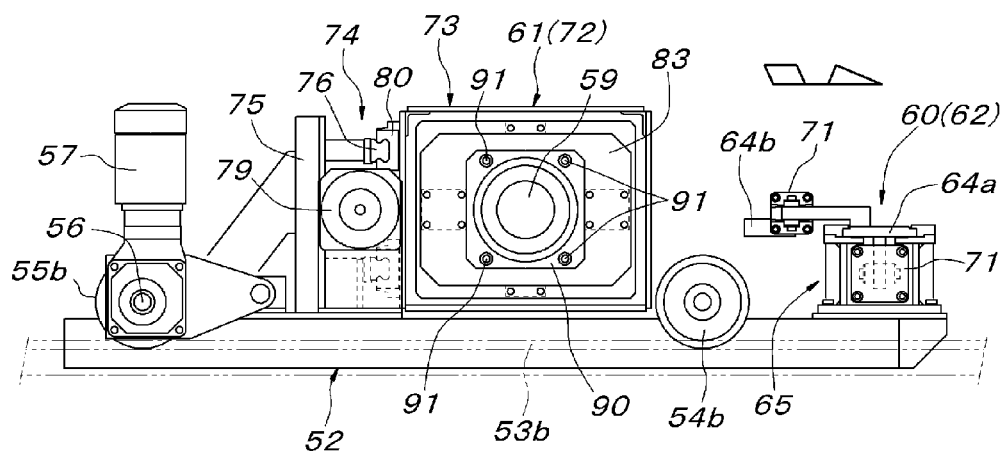
FIG. 16 is a side view of the power source carriage.
Figure 17:
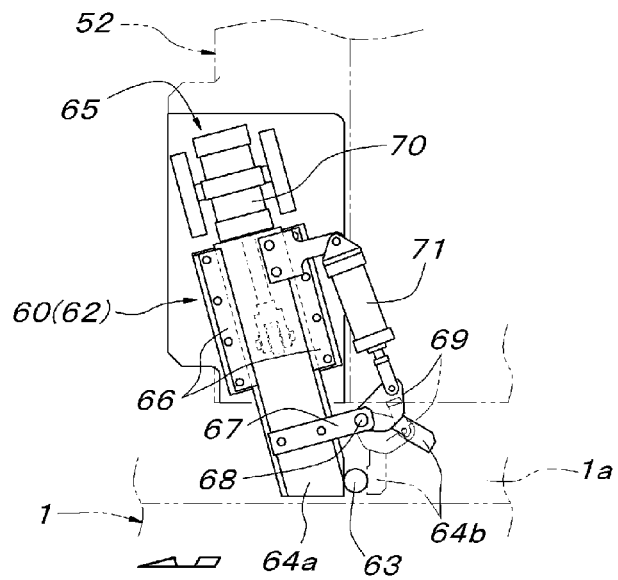
FIG. 17 is a plan view showing a synchronization drive means to drive the power source carriage and the conveying carriage to travel in synchronization.

Next, the power source carriage for applying torque to the passive shaft 22 of the elevating drive means 3 as configured above will be described based on FIGS. 14 to 26. This power source carriage 52 is juxtaposed aside of the traveling path of the conveying carriage 1 (on the side where the passive shaft 22 is located) at each workpiece support height changing position C1, C2, E1, or E2 set within the second and third working sections C-D and E-F in the automobile assembly line as shown in FIG. 1. The power source carriage 52 reciprocates within a fixed range on a pair of left and right guide rails 53*a* and 53*b* laid on the floor parallel to the traveling path of the conveying carriage 1. That is, the power source carriage 52 includes front and rear two pairs of left and right flanged wheels 54*a* to 55*b* fitted to the guide rails 53*a* and 53*b*, a driving shaft 56 attaching one paired left and right flanged wheels 55*a* and 55*b* together, and a reducer equipped motor 57 rotationally driving the driving shaft 56, as shown in FIGS. 14 to 16. The reducer equipped motor 57 is operated to rotationally drive the paired left and right flanged wheels 55*a* and 55*b*, whereby the power source carriage 52 can self-travel. However, the power source carriage 52 can freely move back and forth on the guide rails 53*a* and 53*b* while the reducer equipped motor 57 is not operated. That is, the reducer equipped motor 57 used is one that has a reducer without a self-lock function or one that an electromagnetic clutch is interposed at an output side thereof and automatically connected only when the reducer equipped motor 57 is operated.

The afore-described power source carriage 52 is provided with a transmission shaft 58 transmitting power to the passive shaft 22 of the elevating drive means 3 of the conveying carriage 1 side, a reducer equipped motor 59 driving the transmission shaft 58, a synchronization drive means 60 to drive the power source carriage 52 to travel synchronously with the conveying carriage 1, and a separable interlocking means 61 to interlock the passive shaft 22 and the transmission shaft 58 together. The synchronization drive means 60 can electrically control the reducer equipped motor 57 rotationally driving the flanged wheels 55*a* and 55*b* and can drive the conveying carriage 1 traveling forward at a constant speed and the power source carriage 52 to travel synchronously. In this embodiment, however, the synchronization drive means 60 is composed of a couplable and separable coupling means 62 to couple the conveying carriage 1 and the power source carriage 52.

Hereinafter, a detailed configuration will be described. The coupling means 62 is constituted by a held portion 63 formed of a shaft body projected vertically downward at one of both lateral sides of the carriage main body 1*a* of the conveying carriage 1, which lateral side is provided with the passive shaft 22, openable and closable holders 64*a* and 64*b* provided to the power source carriage 52 so as to be capable of holding the held portion 63 from the front and rear of the traveling direction of the conveying carriage 1, and a switch drive means 65 provided to the power source carriage 52 to switch the holders 64*a* and 64*b* between a retract state of retracting outside the moving path of the held portion 63 and a holding state of holding the held portion 63. Of the holders 64*a* and 64*b*, the holder 64*a* which receives the held portion 63 of the conveying carriage 1 side is composed of a broad strip body supported by a slide guide 66 positionally fixed on the power source carriage 52 so as to be movable in and out. The holder 64*a* is inclined such that a distal end thereof retracts in a direction opposite to the advancing direction of the conveying carriage 1, but not in a manner that the in-and-out direction thereof (the length direction of the holder 64*a*) is perpendicular and horizontal with respect to the traveling path of the conveying carriage 1. The holder 64*a* is provided with a movable plate 69 at one of both lateral sides in the vicinity of the distal end thereof, which lateral side is opposite to the advancing direction of the conveying carriage 1. The movable plate 69 is rotatably and pivotally supported by a vertical spindle 68 to a bearing plate 67 fixed to the holder 64*a*, and to this movable plate 69, the other holder 64*b* is fixed.

The switch drive means 65 is composed of a cylinder unit 70 driving the holder 64*a* to move in and out and a cylinder unit 71 interposed between the movable plate 69 and the holder 64*a* and driving the movable plate 69 (the holder 64*b*) to open and close. Thus, when the holder 64*a* is kept advanced to its advance limit position by the cylinder unit 70 with the holder 64*b* opened with respect to the holder 64*a* as shown by the solid line in FIG. 17 in the power source carriage 52 waiting at the workpiece support height changing position C1, C2, E1, or E2, the held portion 63 of the conveying carriage 1 having traveled forward at a constant speed passes in front of the opened holder 64*b* and then abuts against the distal end of the holder 64*a*. As a result, the power source carriage 52 whose traveling is not locked is subjected to thrust of the conveying carriage 1 side via the held portion 63 and the holder 64*a* and starts to travel forward in the same direction as the conveying carriage 1. Thus, the holder 64*b* is closed about the vertical spindle 68 via the movable plate 69 by the cylinder unit 71 immediately after that, and the held portion 63 of the conveying carriage 1 side can be held between the holders 64*a* and 64*b*. As a result, the power source carriage 52 is brought into a coupled state with the conveying carriage 1, is subjected to thrust of the conveying carriage 1, and travels forward together with the conveying carriage 1.

In order to release the synchronous traveling of the power source carriage 52 with respect to the conveying carriage 1, the holder 64*b* is opened about the vertical spindle 68 via the movable plate 69 by the cylinder unit 71 and the holding action toward the held portion 63 of the conveying carriage 1 side is released. After that, the holder 64*a* at the advance limit position is made to retract to its retract limit position by the cylinder unit 70, and the holders 64*a* and 64*b* are made to retract outward from the moving path of the held portion 63 of the conveying carriage 1 side as shown in FIG. 14. In this state, the flanged wheels 55*a* and 55*b* are forcibly driven by the reducer equipped motor 57, whereby the power source carriage 52 can be made to travel rearward and be returned to its original fixed position (the workpiece support height changing position C1, C2, E1, or E2).

The transmission shaft 58 of the power source carriage 52 side and the passive shaft 22 of the conveying carriage 1 side at the time when the power source carriage 52 and the conveying carriage 1 are coupled and integrated by the coupling means 62 as described above are positioned orthogonal to the traveling direction of the conveying carriage 1 and concentrically with each other. These transmission shaft 58 and passive shaft 22 are provided with respective rotation transmitting fitting distal ends 58*a* and 22*a* fittable to and separable from each other. The afore-described interlocking means 61 is composed of a transmission shaft in-and-out drive means 72 to drive the transmission shaft 58 to move in and out in an axial center direction thereof.

Hereinafter, a detailed configuration of the transmission shaft in-and-out drive means 72 will be described based on FIGS. 18 to 23. A movable body 73 supported reciprocably in the axial center direction of the transmission shaft 58 and a movable body drive means 74 to reciprocate the movable body 73 are provided on the power source carriage 52. The movable body drive means 74 includes upper and lower slide guide rails 76 laid on a lateral surface of a vertical support body 75 erected on the power source carriage 52, a screw shaft 78 supported to only be self-rotatable parallel to the slide guide rails 76 between the slide guide rails 76 by a bearing 77 attached on the lateral surface of the support body 75, and a reducer equipped motor 79 driving the screw shaft 78 to rotate in forward and reverse directions. The movable body 73 includes sliding blocks 80 fitted to the slide guide rails 76 and a nut member 81 screwed and fitted to the screw shaft 78. Accordingly, the screw shaft 78 is driven to rotate in forward and reverse directions by the reducer equipped motor 79, whereby the movable body 73 can be reciprocated along the slide guide rails 76 in the axial center direction of the transmission shaft 58. It is noted that the lateral surface of the support body 75 is provided with stoppers 82*a* and 82*b* to define both end positions of a reciprocating stroke of the movable body 75.

Figure 20:
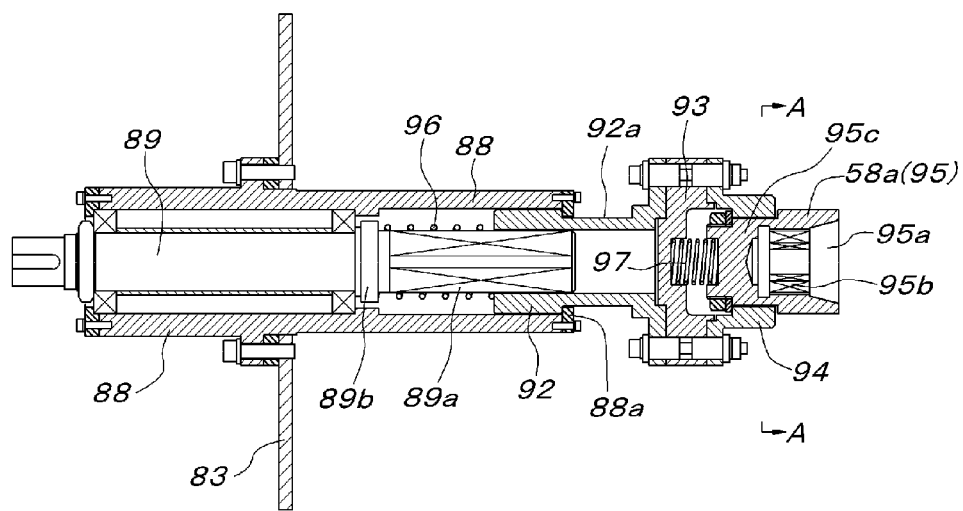
FIG. 20 is an enlarged cross sectional plan view showing a main part of FIG. 19.

The movable body 73 has a rectangular box shape whose rear surface opposite to the traveling path side of the conveying carriage 1 is opened. Inside the movable body 73, a movable base plate 83 parallel to a front plate 73*a* is supported freely movably in two-dimensional, top-bottom and left-right directions within a fixed range via a self-aligning support means 84. A circular cylindrical bearing member 88 is fixed to the movable base plate 83 concentrically with the transmission shaft 58. A relay shaft 89 is concentrically supported by the circular cylindrical bearing member 88 so as to only be self-rotatable. The reducer equipped motor 59 that rotates the transmission shaft 58 in forward and reverse directions via the relay shaft 89 is supported to the movable base plate 83 via a circumferential plurality of coupling shaft bodies 91 coupling a motor support plate 90 supporting the motor 59 and the movable base plate 83, while projecting to the rearward of the movable body 73. The transmission shaft 58 is composed of an inner cylindrical shaft portion 92 fitted to an angular shaft portion 89*a* at a distal end side of the relay shaft 89 so as to be slidable only in the axial center direction within a fixed range, an intermediate seat plate 93 and a distal end cylindrical shaft portion 94 concentrically and integrally coupled to a distal end of the inner cylindrical shaft portion 92, and a distal end shaft portion 95 concentrically supported on the distal end cylindrical shaft portion 94. The inner cylindrical shaft portion 92 is fitted so as to be movable in and out with respect to the circular cylindrical bearing member 88 and is biased and held at its advance limit position with respect to the relay shaft 89 as shown in FIG. 20 by a compression coil spring 96 fitted outside the angular shaft portion 89*a* between an inner end of the inner cylindrical shaft portion 92 and an intermediate flange 89*b* of the relay shaft 89. To a distal end of the circular cylindrical bearing member 88, there is attached a retainer 88*a* fitted to a smaller diameter barrel 92*a* formed in the inner cylindrical shaft portion 92 of the transmission shaft 58 and controlling an axial center direction sliding range of the transmission shaft 58 with respect to the relay shaft 89.

Figure 21:
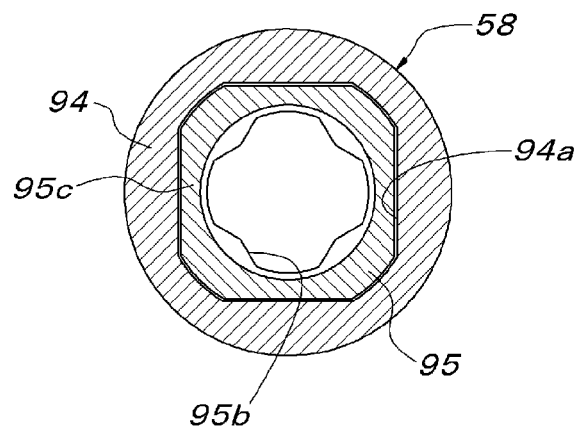
FIG. 21 is an enlarged sectional view taken along a line A-A of FIG. 20.

The distal end shaft portion 95 of the transmission shaft 58 is concentrically formed with an angular hole 95*b* provided with a flared insertion guide 95*a*, which constitutes the afore-described rotation transmitting fitting distal end 58*a*. The distal end shaft portion 95 includes an angular shaft portion 95*c* tiltably penetrating a through angular hole 94*a* provided to the distal end cylindrical shaft portion 94 in any direction of 360 degrees within a fixed slight range as shown in FIG. 20 and FIG. 21. The distal end shaft portion 95 is kept in a parallel posture almost concentric with the inner cylindrical shaft portion 92 by a compression coil spring 97 interposed with the intermediate seat plate 93.

Two positioning rods 98*a* and 98*b* are supported to the movable base plate 83 of the movable body 73 parallel to the transmission shaft 58 in such a manner as to sandwich the transmission shaft 58. The positioning rods 98*a* and 98*b* penetrate cylindrical guides 99*a* and 99*b* attached to the movable base plate 83 so as to be movable in axial center directions thereof. The positioning rods 98*a* and 98*b* are also biased and held at their advance limit positions where stoppers 103*a* and 103*b* positionally adjustably attached to rear ends of the positioning rods 98*a* and 98*b* abut against rear ends of the cylindrical guides 99*a* and 99*b*, by compression coil springs 102*a* and 102*b* fitted outside the positioning rods 98*a* and 98*b* between fixed spring seats 100*a* and 100*b* fixed to the positioning rods 98*a* and 98*b* and movable spring seats 101*a* and 101*b* loosely fitted to the positioning rods 98*a* and 98*b* so as to be movable in the axial center directions and abutting against front ends of the cylindrical guides 99*a* and 99*b*. Further, the positioning rods 98*a* and 98*b* are respectively provided with conical pointed ends 104*a* and 104*b*.

As shown in FIGS. 11, 12, 24, and 25, the rotation transmitting fitting distal end 22*a* of the passive shaft 22 of the conveying carriage 1 side is formed into an angular shaft shape that is fitted to the angular hole 95*b* of the rotation transmitting fitting distal end 58*a* of the transmission shaft 58 of the power source carriage 52 side. Positioning fitted members 106*a* and 106*b* having conical holes 105*a* and 105*b* fitted with the conical pointed ends 104*a* and 104*b* of the two positioning rods 98*a* and 98*b* of the power source carriage 52 side are fixed to one of the support plates 46 supporting the passive shaft 22 in such a manner as to sandwich the passive shaft 22.

Figure 18:
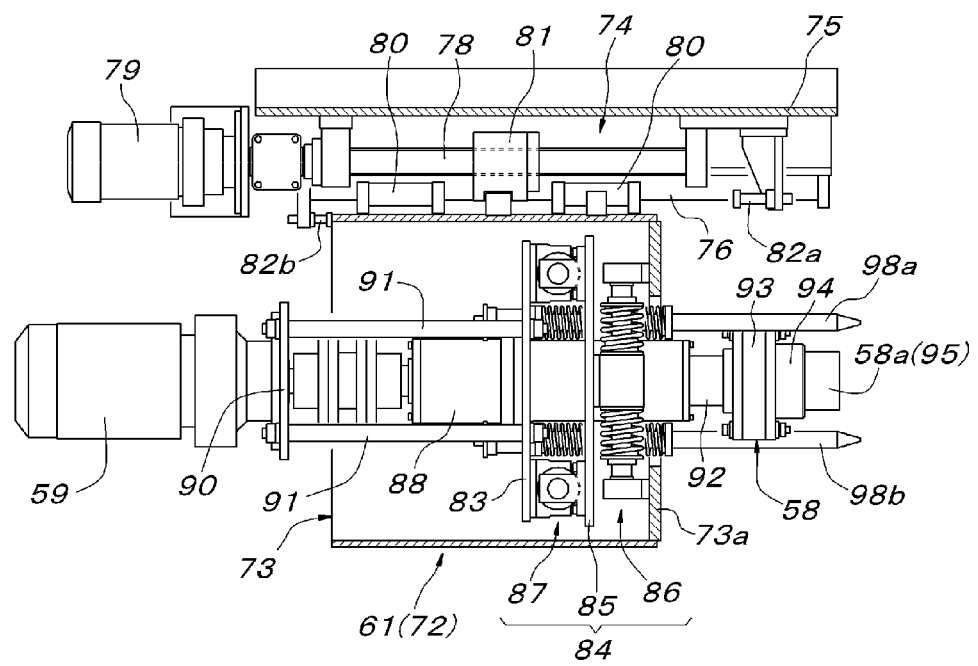
FIG. 18 is a partial cross sectional plan view showing an interlocking means between a transmission shaft of the power source carriage side and a passive shaft of the conveying carriage side.
Figure 22:
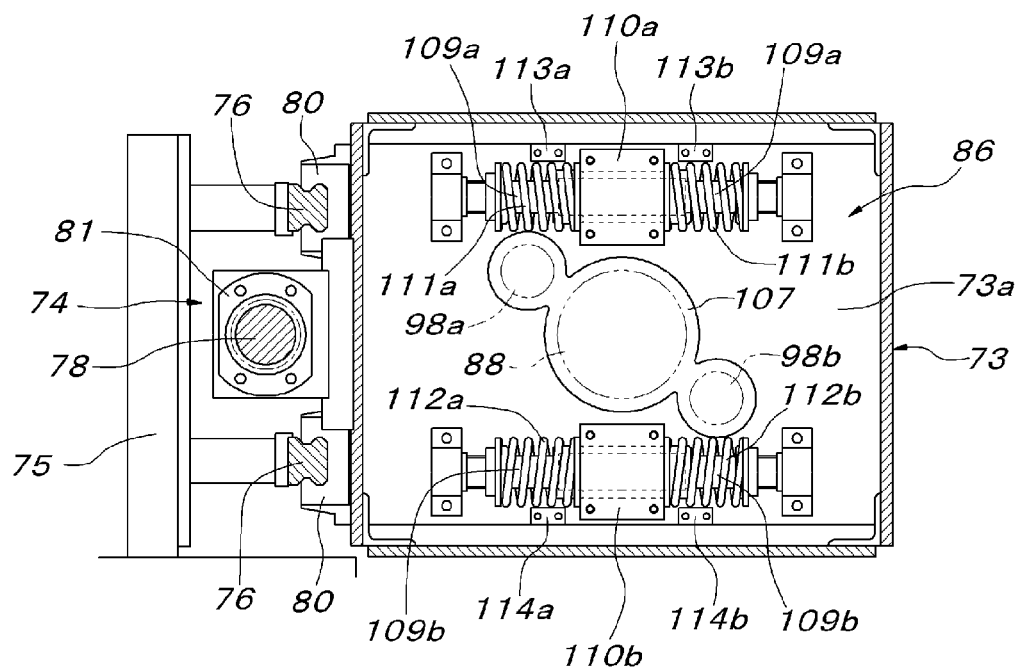
FIG. 22 is a longitudinal sectional view at B position, showing an interior configuration of a movable body shown in FIG. 18 and a drive means for the movable body.
Figure 23:
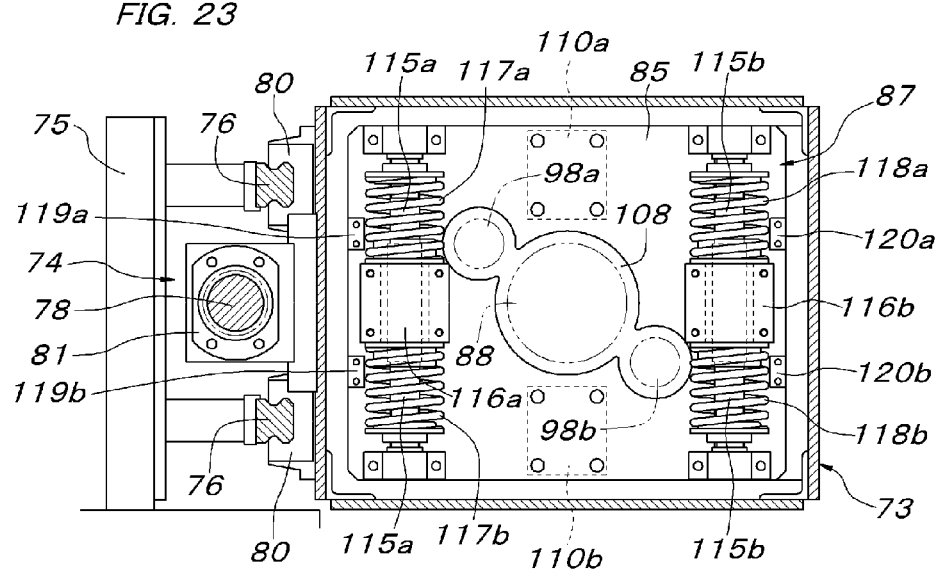
FIG. 23 is a longitudinal sectional view at C position, showing the interior configuration of the movable body shown in FIG. 18 and the drive means for the movable body.

The self-aligning support means 84 to support the movable base plate 83 inside the movable body 73 is constituted by an intermediate movable plate 85 arranged between the front plate 73*a* of the movable body 73 and the movable base plate 83, a horizontal self-aligning mechanism 86 interposed between the intermediate movable plate 85 and the front plate 73*a*, and a vertical self-aligning mechanism 87 interposed between the intermediate movable plate 85 and the movable base plate 83, as shown in FIG. 18. Thus, the intermediate movable plate 85 and the front plate 73*a* of the movable body 73 are provided with through holes 107 and 108 through which the circular cylindrical bearing member 88 supporting the transmission shaft 58 and the relay shaft 89 and the two positioning rods 98*a* and 98*b* penetrate, as shown in FIG. 22 and FIG. 23. The through holes 107 and 108 are sized to allow the circular cylindrical bearing member 88 and the positioning rods 98*a* and 98*b* to move within a moving range in a two-dimensional vertical plane of the movable base plate 83 permitted by the self-aligning support means 84.

The horizontal self-aligning mechanism 86 is composed of a pair of upper and lower horizontal guide rods 109*a* and 109*b* horizontally disposed on the front plate 73*a* of the movable body 73 at two positions, above and beneath the circular cylindrical bearing member 88, a pair of upper and lower sliding bodies 110*a* and 110*b* slidably fitted outside respective horizontal guide rods 109*a* and 109*b* and attached to the intermediate movable plate 85, and compression coil springs 111a, 111b, 112a, and 112b loosely fitted to the horizontal guide rods 109a and 109b in such a manner as to sandwich respective sliding bodies 110a and 110b therebetween and biasing and holding respective sliding bodies 110a and 110b at middle positions of the horizontal guide rods 109a and 109b, as shown in FIG. 18 and FIG. 22. Reference symbols 113a and 113b, and 114a and 114b denote stoppers attached to the front plate 73a of the movable body 73 so as to regulate sliding ranges of respective sliding bodies 110a and 110b.

Further, the vertical self-aligning mechanism 87 is composed of a pair of left and right vertical guide rods 115a and 115b vertically disposed on the intermediate movable plate 85 on both left and right sides of the circular cylindrical bearing member 88, a pair of left and right sliding bodies 116a and 116b slidably fitted outside respective vertical guide rods 115a and 115b and attached to the movable base plate 83, and compression coil springs 117a, 117b, 118a, and 118b loosely fitted to the vertical guide rods 115a and 115b in such a manner as to sandwich respective sliding bodies 116a and 116b therebetween and biasing and holding respective sliding bodies 116a and 116b at middle positions of the vertical guide rods 115a and 115b, as shown in FIG. 18 and FIG. 23. Reference symbols 119a and 119b, and 120a and 120b denote stoppers attached to the intermediate movable plate 85 so as to regulate sliding ranges of respective sliding bodies 116a and 116b.

According to the self-aligning support means 84 thus configured, the intermediate movable plate 85 is held with respect to the front plate 73a of the movable body 73 by the compression coil springs 111a to 112b at a neutral position where the sliding bodies 110a and 110b are respectively positioned in the middle of the horizontal guide rods 109a and 109b. The movable base plate 83 is held with respect to the intermediate movable plate 85 by the compression coil springs 117a to 118b at a neutral position where the sliding bodies 116a and 116b are respectively positioned in the middle of the vertical guide rods 115a and 115b. Thus, the transmission shaft 58 supported to the movable base plate 83 is stable at a fixed position (neutral position) in the two-dimensional vertical plane. When an external force in a direction along the two-dimensional vertical plane is exerted upon this transmission shaft 58, a horizontal component of exerted directions of the external force can move the intermediate movable plate 85 parallel to the front plate 73a of the movable body 73 to a position restricted by the stoppers 113a and 114a or 113b and 114b together with the sliding bodies 110a and 110b against biasing forces of the compression coil springs 111a and 112a or 111b and 112b. A vertical component of the exerted directions of the external force can move the movable base plate 83 parallel to the intermediate movable plate 85 to a position restricted by the stoppers 119a and 120a or 119b and 120b together with the sliding bodies 116a and 116b against biasing forces of the compression coil springs 117a and 118a or 117b and 118b. It is a matter of course that the transmission shaft 58 automatically returns to the fixed position (neutral position) in the two-dimensional vertical plane and is stabilized when the external force disappears.

Figure 19:
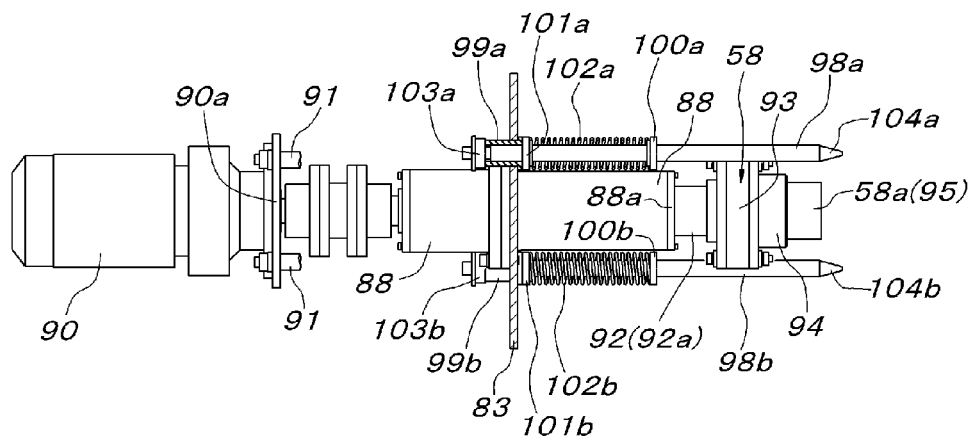
FIG. 19 is a partial cross sectional plan view showing a main part of FIG. 18.

Use and operation of the power source carriage 52 configured as above will be described. Once the power source carriage 52 waiting at the fixed position corresponding to each workpiece support height changing position C1, C2, E1, or E2 set within the second and third working sections C-D and E-F of the automobile assembly line as shown in FIG. 1 starts to travel synchronously with the conveying carriage 1 having been traveling at a constant speed by the holders 64a and 64b of the synchronization drive means 60 (coupling means 62) holding the held portion 63 of the conveying carriage 1 side therebetween as described above, the movable body 73 waiting at the retract limit position abutting against the stopper 82b is moved forward along the slide guide rail 76 by driving the reducer equipped motor 79 of the movable body drive means 74 to rotate in the forward direction, as shown in FIGS. 14, 15, and 18. The transmission shaft 58 at this time is held at the advance limit position with respect to the relay shaft 89 by the biasing force of the compression coil spring 96 as shown in FIG. 20. The two positioning rods 98a and 98b are also held at the advance limit positions with respect to the movable base plate 83 by the biasing forces of the compression coil springs 102a and 102b as shown in FIG. 19. The conical pointed ends 104a and 104b of the positioning rods 98a and 98b at this time project slightly forward of the distal end of the transmission shaft 58 (the distal end of the distal end shaft portion 95).

Figure 24:
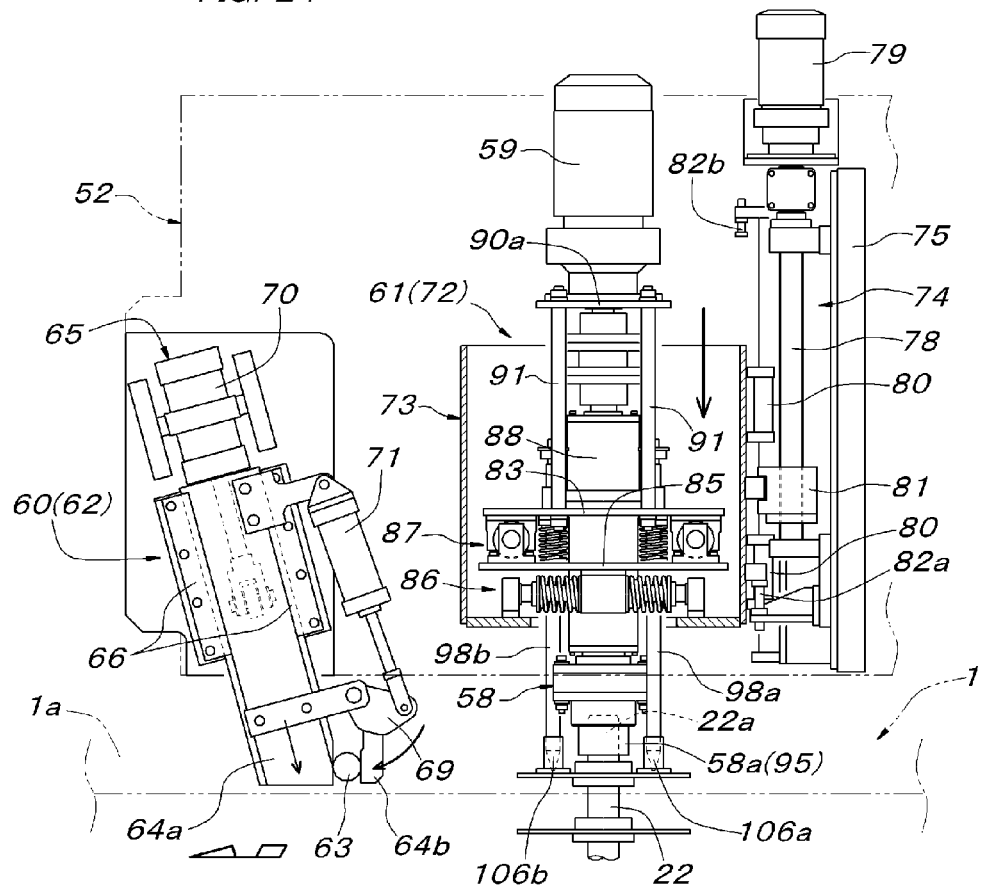
FIG. 24 is a partial cross sectional plan view of a main part showing a synchronous traveling state of the power source carriage and the conveying carriage.
Figure 25:
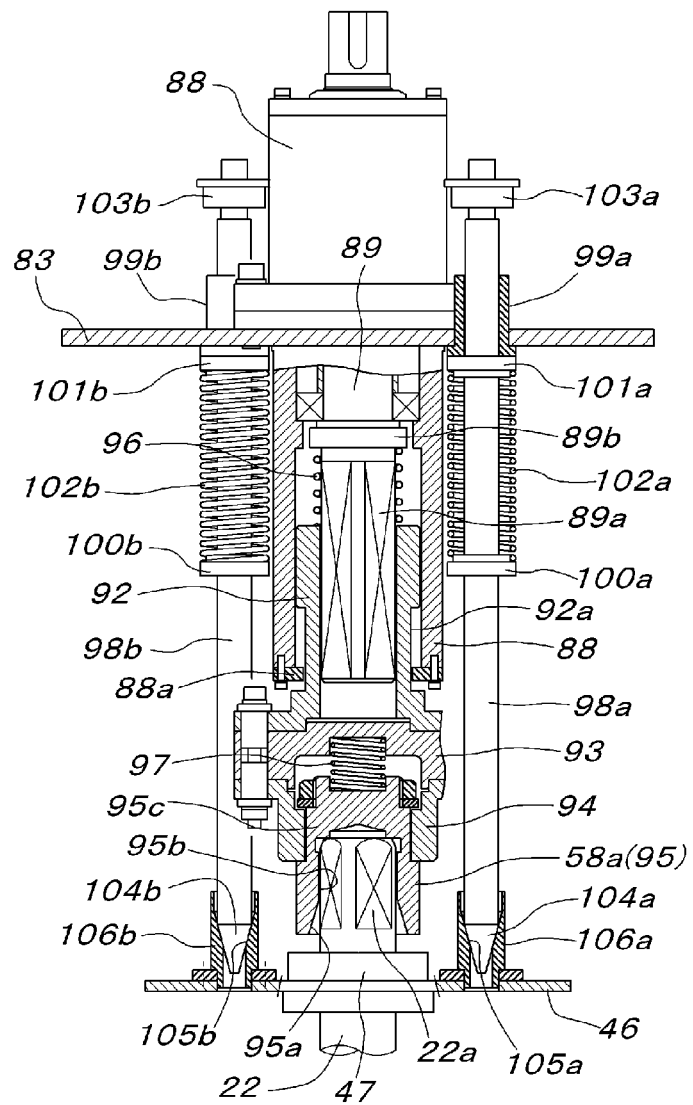
FIG. 25 is an enlarged partial cross sectional plan view showing a main part of FIG. 24.
Figure 26:
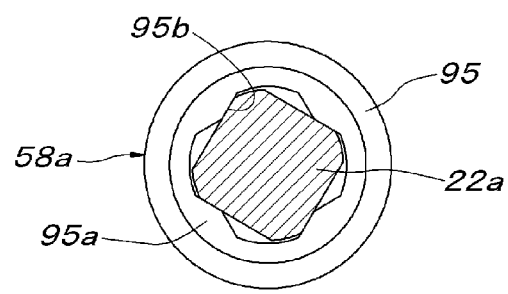
FIG. 26 is an enlarged longitudinal sectional view showing a main part of FIG. 25.

The transmission shaft 58 supported to the movable body 73 moves to approach the conveying carriage 1 due to the forward movement of the movable body 73. The rotation transmitting fitting distal end 58a of the transmission shaft 58, that is, with respect to the passive shaft 22 of the conveying carriage 1 side, the angular hole 95b of the distal end shaft portion 95 is fitted outside the angular shaft shaped rotation transmitting fitting distal end 22a of the passive shaft 22 of the conveying carriage 1 side as shown in FIG. 24 and FIG. 25. Prior to this, the transmission shaft 58 and the two positioning rods 98a and 98b can move along the two-dimensional vertical plane within a fixed range with respect to the movable body 73 against the biasing forces of the compression coil springs 111a to 112b and 117a to 118b as described above in the process of where the conical pointed ends 104a and 104b of the two positioning rods 98a and 98b supported to the movable body 73 are fitted into the conical holes 105a and 105b of the positioning fitted members 106a and 106b of the conveying carriage 1 side. Thus, a misalignment between axial centers of the two positioning rods 98a and 98b and the conical holes 105a and 105b of the positioning fitted members 106a and 106b, and furthermore a misalignment between axial centers of the rotation transmitting fitting distal end 58a of the transmission shaft 58 (the angular hole 95b of the distal end shaft portion 95) and the angular shaft shaped rotation transmitting fitting distal end 22a of the passive shaft 22 are automatically corrected. Consequently, fitting of the rotation transmitting fitting distal end 58a of the transmission shaft 58 (the angular hole 95b of the distal end shaft portion 95) into the angular shaft shaped rotation transmitting fitting distal end 22a of the passive shaft 22 can be performed smoothly and reliably.

When the movable body 73 reaches its advance limit position positioned by the stopper 82a, the two positioning rods 98a and 98b have moved rearward against the compression coil springs 102a and 102b and the transmission shaft 58 has moved rearward relative to the relay shaft 89 against the compression coil spring 96 since the distal end shaft portion 95 of the transmission shaft 58 is relatively pushed by the distal end of the passive shaft 22, as shown in FIG. 24 and FIG. 25. Thus, the transmission shaft 58 is pressed forward by reaction force of the compression coil spring 96, and the state where the rotation transmitting fitting distal end 58a of the transmission shaft 58 (the angular hole 95b of the distal end shaft portion 95) is fitted to the angular shaft shaped rotation transmitting fitting distal end 22a of the passive shaft 22 is reliably kept. Moreover, even if the rotation transmitting fitting distal end 58a of the transmission shaft 58 (the angular hole 95b of the distal end shaft portion 95) and the angular shaft shaped rotation transmitting fitting distal end 22a of the passive shaft 22 are out of phase circumferentially and the rotation transmitting fitting distal end 22a of the passive shaft 22 is butted with the angular hole 95b without being fitted thereto, a retract movement amount of the transmission shaft 58 with respect to the relay shaft 89 is only increased and the axial pushing state between the rotation transmitting fitting distal end 58a of the transmission shaft 58 side and the rotation transmitting fitting distal end 22a of the passive shaft 22 side is maintained. Therefore, the both are fitted to each other without fail when the transmission shaft 58 is rotationally driven as described later. Furthermore, the distal end shaft portion 95 of the transmission shaft 58 is not completely fixed and integrated with the transmission shaft 58 (the inner cylindrical shaft portion 92), and an appropriate clearance against the compression coil spring 97 is ensured between the both. Thus, the fitting between the distal end shaft portion 95 (the rotation transmitting fitting distal end 58a) of the transmission shaft 58 and the rotation transmitting fitting distal end 22a of the passive shaft 22 is carried out smoothly and reliably even with a slight relative inclination of axial centers therebetween.

Once the movable body 73 reaches its advance limit position as described above and the fitting of the rotation transmitting fitting distal end 58a of the transmission shaft 58 (the angular hole 95b of the distal end shaft portion 95) to the angular shaft shaped rotation transmitting fitting distal end 22a of the passive shaft 22 is completed, the reducer equipped motor 59 is operated to rotationally drive the relay shaft 89, whereupon a torque thereof is transmitted to the passive shaft 22 via the angular shaft portion 89a of the relay shaft 89, the inner cylindrical shaft portion 92 of the transmission shaft 58, the intermediate seat plate 93, the through angular hole 94a of the distal end cylindrical shaft portion 94, the angular shaft portion 95c of the distal end shaft portion 95, the angular hole 95b of the distal end shaft portion 95, and the rotation transmitting fitting distal end 22a of the passive shaft 22. Then, the passive shaft 22 of the conveying carriage 1 can be rotationally driven.

Figure 11:
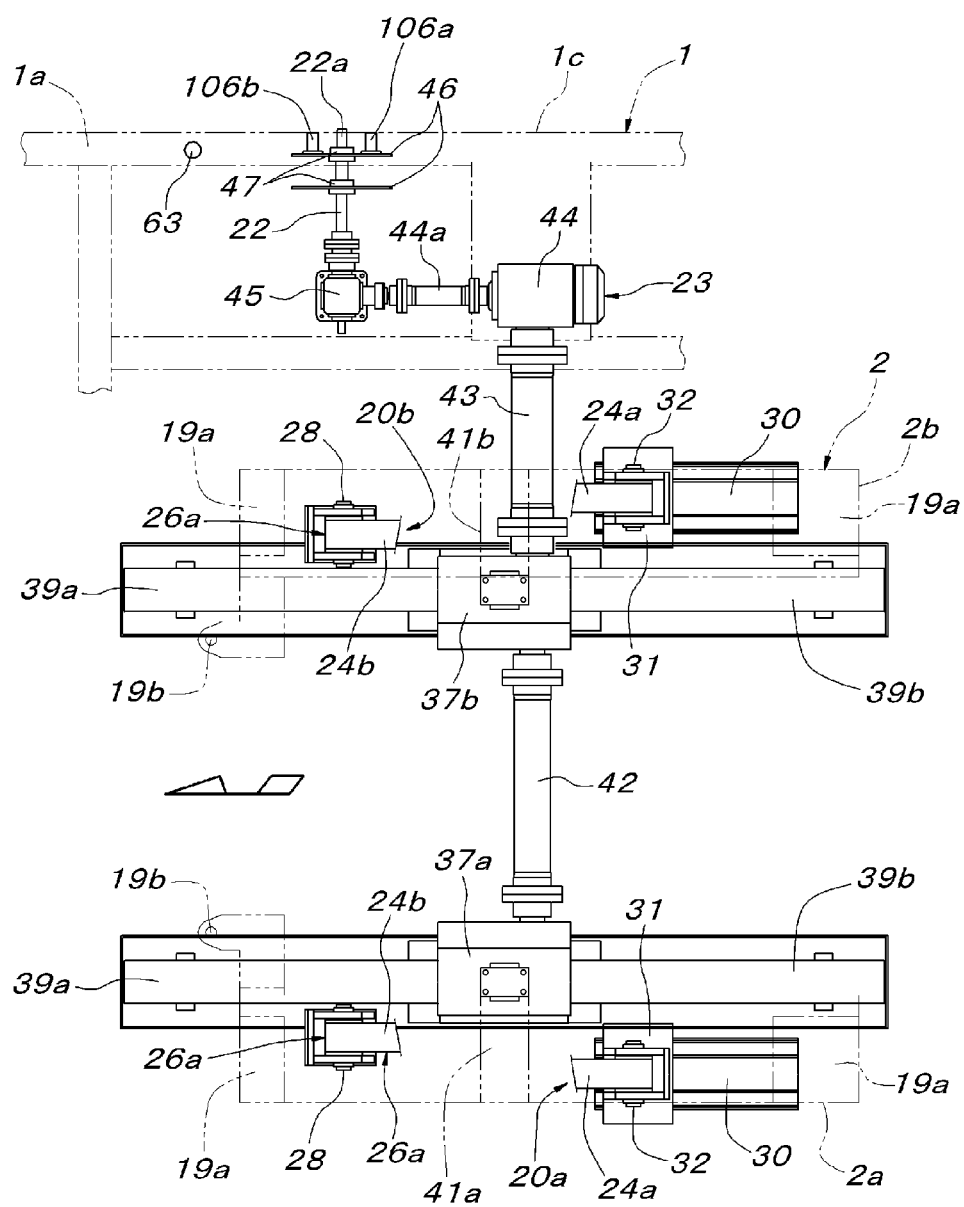
FIG. 11 is a plan view showing a part of the elevating drive means and a power transmission system for the elevating drive means.

The passive shaft 22 of the conveying carriage 1 is rotationally driven, whereupon a torque thereof is transmitted to the driving shaft 43 of elevating drive means 3 of the workpiece support base 2 via the right-angled transmission means 45 and the worm gear reducer 44 as shown in FIG. 11 and FIG. 12, and the chain wheels 38a and 38b of the paired left and right zipper chain mechanisms 21a and 21b working in synchronization with each other by the transmission shaft 42 are rotationally driven. Thus, the rotation direction of the transmission shaft 58 of the power source carriage 52 side may just be determined so as for the chain wheels 38a and 38b to be rotated forwardly in such a direction that the chain main bodies 40a and 40b of the paired left and right zipper chain mechanisms 21a and 21b are pushed up, at the workpiece support height changing position C1 or E1 where the workpiece support base 2 as shown in FIG. 1 is raised, and so as for the chain wheels 38a and 38b to be rotated reversely in such a direction that the chain main bodies 40a and 40b of the paired left and right zipper chain mechanism 21a and 21b are pulled down, at the workpiece support height changing position C2 or E2 where the workpiece support base 2 is lowered. Further, the transmission shaft 58 of the power source carriage 52 may just be rotationally driven for the period of time required for raising the workpiece support base 2 to a predetermined level at the workpiece support height changing position C1 or E1 where the workpiece support base 2 is raised and for the period of time required for lowering the workpiece support base 2 to a predetermined level at the workpiece support height changing position C2 or E2 where the workpiece support base 2 is lowered.

Once the elevating drive means 3 of the workpiece support base 2 of the conveying carriage 1 passing through each workpiece support height changing position C1, C2, E1, or E2 is driven by a power source (the reducer equipped motor 59) on the power source carriage 52 towed by the conveying carriage 1 and synchronously traveling but not by a power source on the conveying carriage 1 and when the changing of the workpiece support height by the workpiece support base 2 is completed in the afore-described manner, the driving of the transmission shaft 58 by the reducer equipped motor 59 is stopped and the screw shaft 78 is rotated reversely by the reducer equipped motor 79 of the movable body drive means 74 to retract the transmission shaft 58 and the two positioning rods 98a and 98b to their original waiting positions together with the movable body 73. As a result, the transmission shaft 58 and the two positioning rods 98a and 98b advance to the original waiting positions with respect to the movable body 73 (the movable base plate 83) by the biasing forces of the compression coil springs 102a and 102b and are also separated from the passive shaft 22 and two positioning fitted members 106a and 106b of the conveying carriage 1 side along the axial center directions. After this, the holder 64b of the coupling means 62 constituting the synchronization drive means 60 on the power source carriage 52 is opened by the cylinder unit 71 and the holder 64a is retracted by the cylinder unit 70, whereupon both holders 64a and 64b are retracted to move out lateral to the moving path of the held portion 63 of the conveying carriage 1 side. This separates the power source carriage 52 from the conveying carriage 1 and stops the power source carriage 52. Thus, the reducer equipped motor 57 may just be operated to rotationally drive the flanged wheels 55a and 55b, and the power source carriage 52 may just be moved rearward to the original fixed position (the workpiece support height changing position C1, C2, E1, or E2) on the guide rails 53a and 53b and be made to wait until the next conveying carriage 1 arrives at the fixed position.

Figure 7:
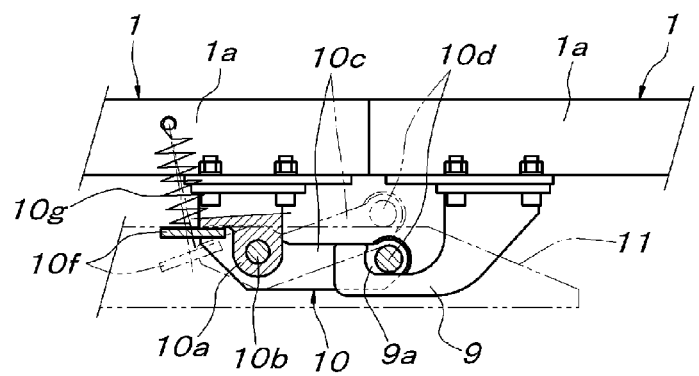
FIG. 7 is a partial longitudinal sectional side view showing the coupling means in a coupling state.
Figure 8:
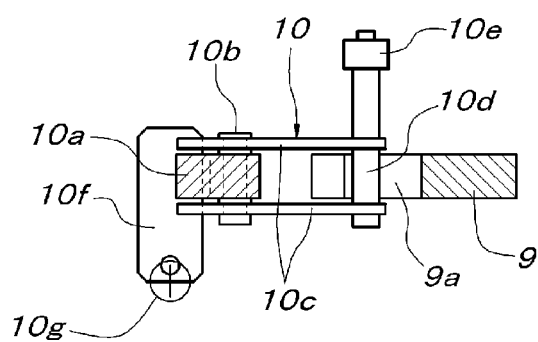
FIG. 8 is a cross sectional plan view of FIG. 7.

At a continuous constant speed traveling section within each working section A-B, C-D, E-F, or G-H where respective conveying carriages 1 are made to travel with front and rear conveying carriages 1 butting against each other, that is, with respective working floors of carriage main bodies 1a thereof being in succession along the direction of the conveying carriage traveling path, a towing lock 10 at the rear end of the immediately preceding conveying carriage 1 is engaged with a towed hook 9 at the front end of the immediately following conveying carriage 1 as shown in FIG. 7 and all of the conveying carriages 1 within the section are brought into coupled states. Then, even if there is no chance of being pushed to be driven by the friction drive Q at the entrance side of the section, each conveying carriage 1 is moved out by the friction drive Q at the exit side of the section, whereupon all of the following conveying carriages 1 can be towed and moved out of the section. In this case, a cam rail 11 as shown by the virtual line in FIG. 7 may just be laid on the floor in a location where the conveying carriages 1 are disconnected and sent out at a higher speed one by one at the exit of each continuous constant speed traveling section, and the towing lock 10 of the conveying carriage 1 to be sent out at a higher speed may be switched into a tow release posture by the cam rail 11 and then the conveying carriage 1 may be disconnected and made to travel at a higher speed. Further, it may be configured such that the cam rail 11 is laid at the entrance side of each continuous constant speed traveling section as well and that a towing lock 10 of the conveying carriage 1 having been sent into each continuous constant speed traveling section is switched into the tow release posture, the towing lock 10 departs from the cam rail 11 and returns to a tow active posture after being butted against the following conveying carriage 1, and the towing lock 10 is engaged with a towed hook 9 of the following conveying carriage 1.

INDUSTRIAL APPLICABILITY

The carriage-type conveying apparatus of the present invention can be utilized for conveying automobile vehicle bodies in an automobile assembly line in which a conveying carriage provided with an elevating drive means to vertically move a workpiece support base is used.

What is claimed is:

1. A carriage-type conveying apparatus comprising:
a conveying carriage provided with an elevatable workpiece support base and an elevating drive means to vertically drive the workpiece support base;
a workpiece support height changing position set on a traveling path of the conveying carriage and, when the conveying carriage passes through the workpiece support height changing position, the elevating drive means being operable to change a height of the workpiece support base;
a power source carriage provided aside of the traveling path of the conveying carriage at the workpiece support height changing position said power source carriage being reciprocable along the traveling path;
a synchronization drive means provided aside of the traveling path of the conveying carriage at the workpiece support height changing position to make the power source carriage travel synchronously with the conveying carriage;
the conveying carriage having a passive shaft interlocked with a driving shaft of the elevating drive means; and having
a locking means to prevent descent of the workpiece support base while the passive shaft does not receive a torque;
the power source carriage having a transmission shaft acceptable to transmit a torque to the passive shaft;
a power source operable to rotationally drive the transmission shaft; and
a separable interlocking means to interlock the passive shaft and the transmission shaft with each other in a state where the conveying carriage and the power source carriage synchronously travel.

2. The carriage-type conveying apparatus according to claim 1, wherein the locking means comprises a worm gear reducer interposed in a transmission system between the driving shaft of the elevating drive means and the passive shaft.

3. The carriage-type conveying apparatus according to claim 1, wherein the synchronization drive means comprises a couplable and separable coupling means to couple the conveying carriage and the power source carriage.

4. The carriage-type conveying apparatus according to claim 3, wherein the coupling means comprises a held portion connected to the conveying carriage, openable and closable holders connected to the power source carriage so as to be capable of holding the held portion therebetween from front and rear of a traveling direction of the conveying carriage, and a switch drive means connected to the power source carriage to switch the holders between a retract state of retracting outside a moving path of the held portion and a holding state of holding the held portion.

5. The carriage-type conveying apparatus according to claim 1, wherein the transmission shaft and the passive shaft are arranged concentrically with each other and orthogonal to a traveling direction in the synchronous traveling state of the conveying carriage and the power source carriage, the transmission shaft and the passive shaft are also provided with respective rotation transmitting fitting distal ends fittable to and separable from each other, and
the interlocking means comprises a transmission shaft in-and-out drive means to drive the transmission shaft to move in and out in an axial center direction thereof.

6. The carriage-type conveying apparatus according to claim 5, wherein the transmission shaft in-and-out drive means is provided with a movable body supported on the power source carriage so as to be reciprocable in the axial center direction of the transmission shaft, a movable body drive means to reciprocate the movable body, a relay shaft supported to the movable body so as to only be self-rotatable, and a motor supported to the movable body (as the power source and rotationally driving the relay shaft,
the transmission shaft is fitted to the relay shaft so as to be relatively movable only in the axial center direction within a fixed range and is biased to an advancing direction with respect to the relay shaft by a spring interposed with the relay shaft, and
the transmission shaft and the passive shaft are fitted to each other at the respective rotation transmitting fitting distal ends when the movable body moves to its advance limit in the synchronous traveling state of the conveying carriage and the power source carriage, and then the transmission shaft moves rearward with respect to the relay shaft against the spring.

7. The carriage-type conveying apparatus according to claim 6, wherein a positioning rod arranged parallel to the transmission shaft and having a conical pointed end is supported to the movable body so as to be reciprocable in an axial center direction within a fixed range and a spring biasing the positioning rod toward the traveling path side of the conveying carriage is juxtaposed,
the conveying carriage is provided with a positioning fitted member having a conical hole to which the conical pointed end of the positioning rod can be fitted, and
the conical pointed end of the positioning rod is fitted to the conical hole of the positioning fitted member before the transmission shaft and the passive shaft are fitted to each other at the respective rotation transmitting fitting distal ends when the movable body is advanced in the synchronous traveling state of the conveying carriage and the power source carriage, and the positioning rod retracts against the spring when the movable body moves to the advance limit.

8. The carriage-type conveying apparatus according to claim 6, wherein the movable body is provided with a movable base plate being movable with respect to an origin position in a two-dimensional vertical plane within a fixed range and being biased and held at the origin position by springs, and the relay shaft and the motor are supported to the movable base plate.

\* \* \* \* \*